June 2, 1959     P. H. CLEFF     2,888,784
MEANS FOR GENERATIVELY FINISHING INVOLUTE GEARS
Filed Sept. 7, 1954     23 Sheets-Sheet 3

Inventor
Peter H. Cleff
By Ralph B. Stewart
Attorney

June 2, 1959  P. H. CLEFF  2,888,784
MEANS FOR GENERATIVELY FINISHING INVOLUTE GEARS
Filed Sept. 7. 1954  23 Sheets-Sheet 4

Inventor
Peter H. Cleff
By Ralph B. Stewart
Attorney

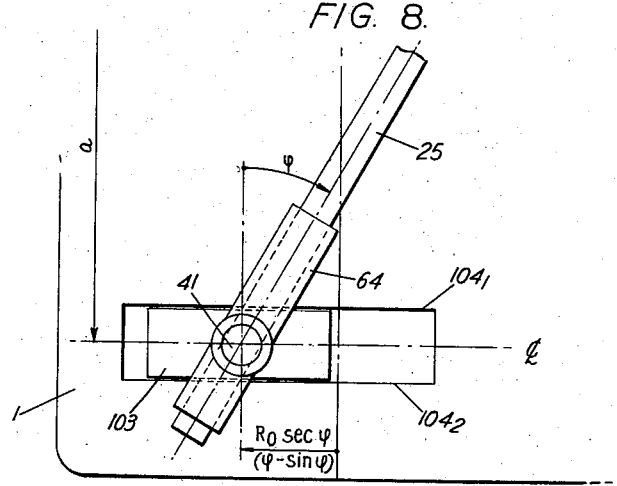
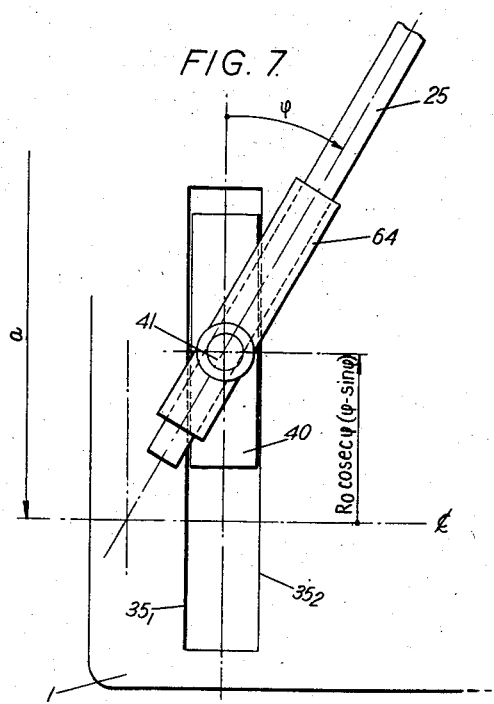

June 2, 1959   P. H. CLEFF   2,888,784
MEANS FOR GENERATIVELY FINISHING INVOLUTE GEARS
Filed Sept. 7, 1954   23 Sheets-Sheet 6
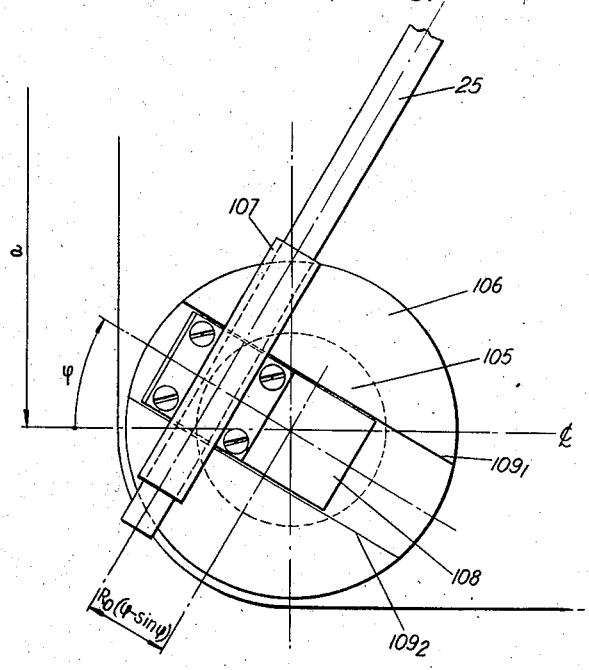
FIG. 9.
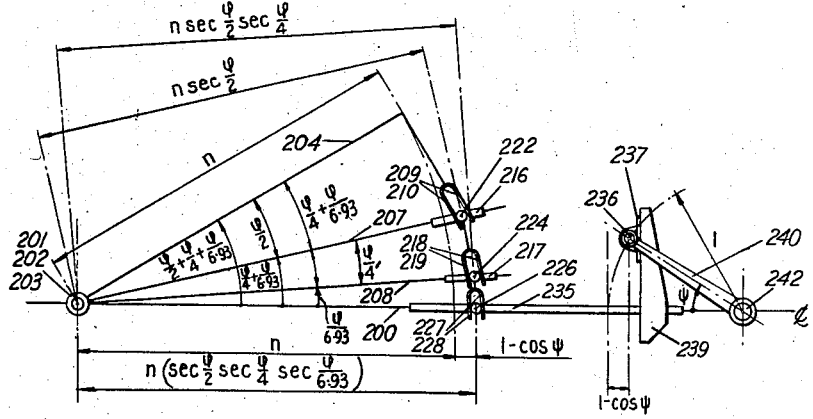
FIG. 26.  $1-\cos\psi = n(\psi \cosec\psi - 1) = n(\sec\frac{\psi}{2}\sec\frac{\psi}{4}\sec\frac{\psi}{6.93} - 1) \pm 0.0000005.$
Inventor
Peter H. Cleff
By Ralph B. Stewart
Attorney June 2, 1959 P. H. CLEFF 2,888,784
MEANS FOR GENERATIVELY FINISHING INVOLUTE GEARS
Filed Sept. 7. 1954 23 Sheets-Sheet 7

Inventor
Peter H. Cleff
By Ralph B. Stewart
Attorney

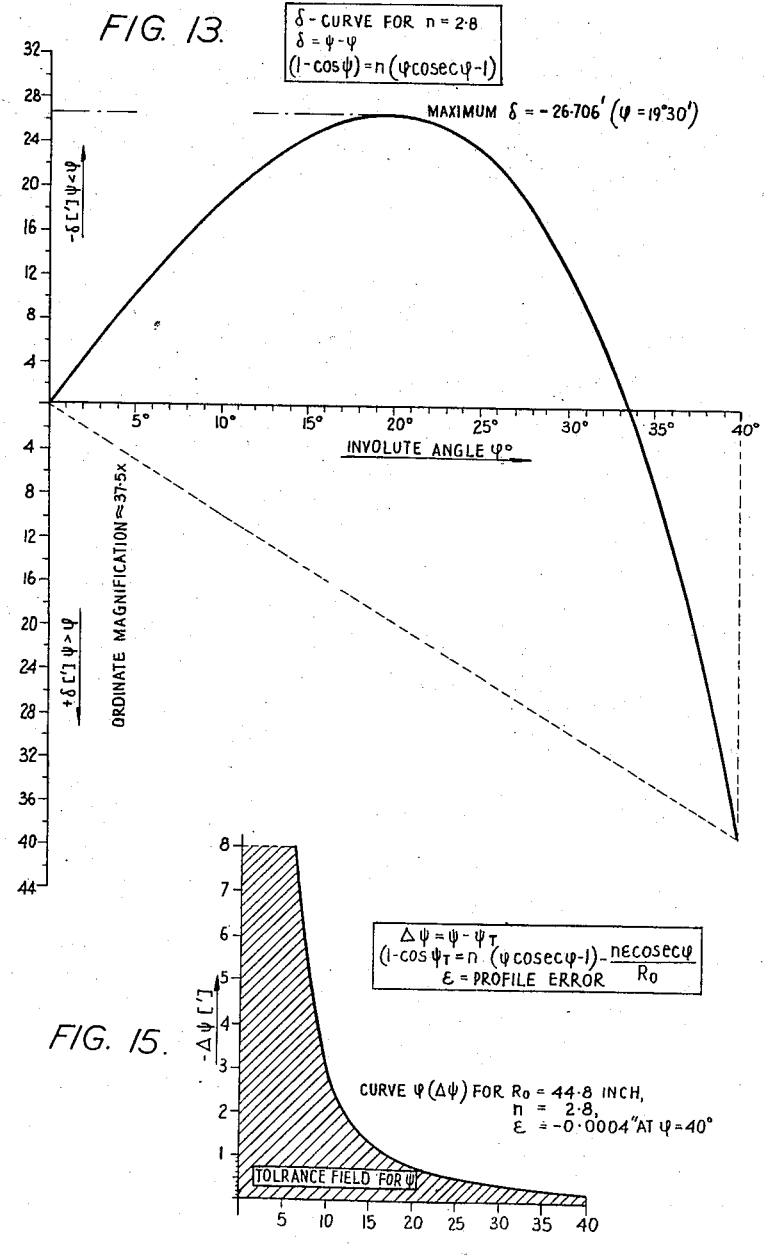

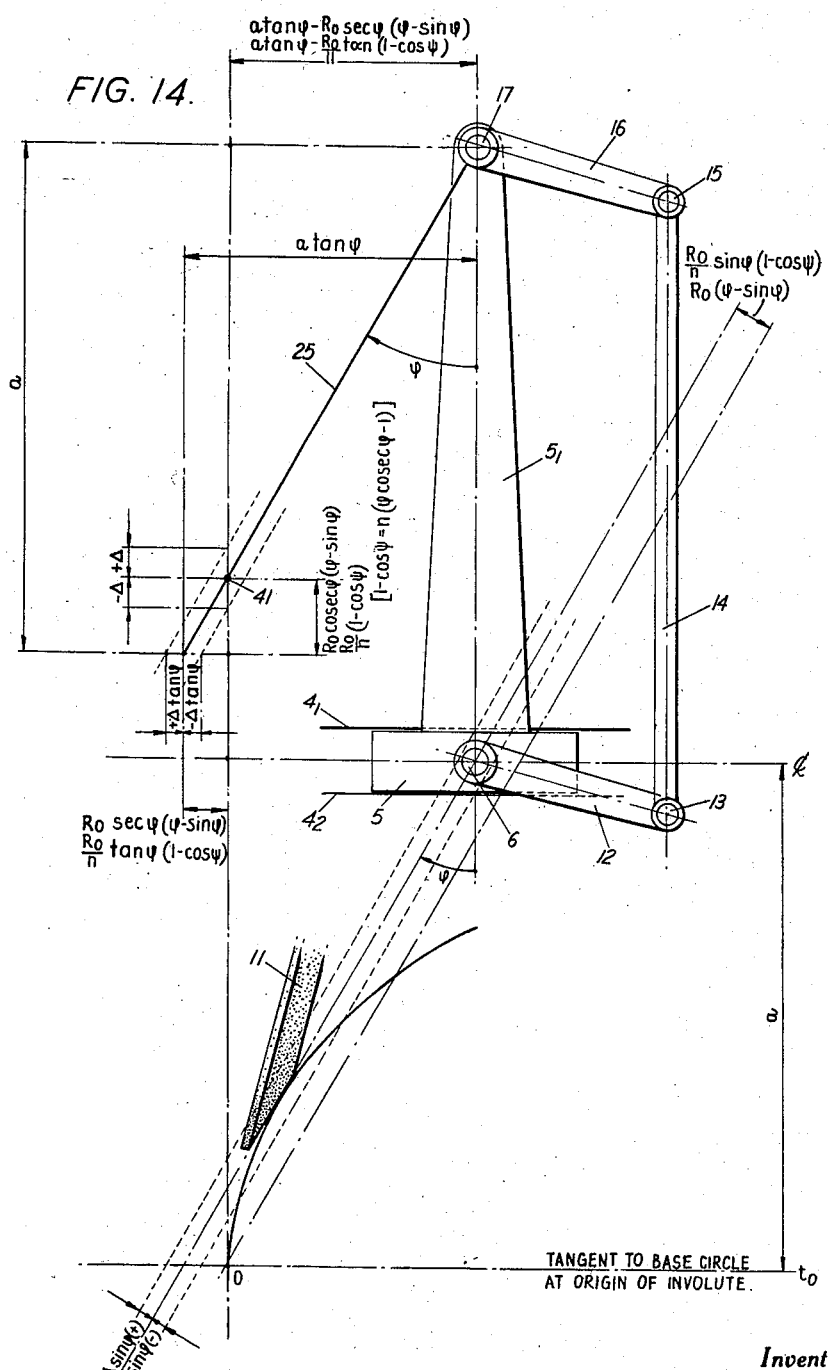

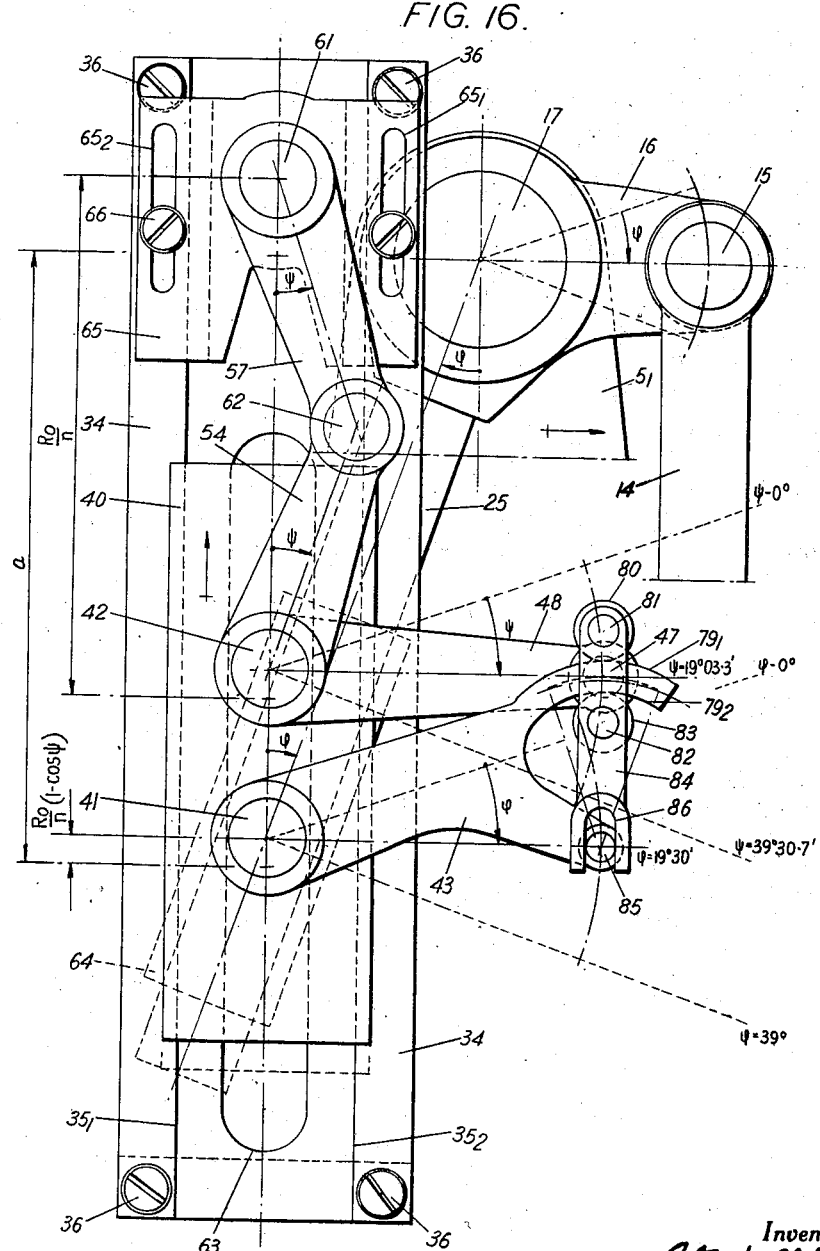

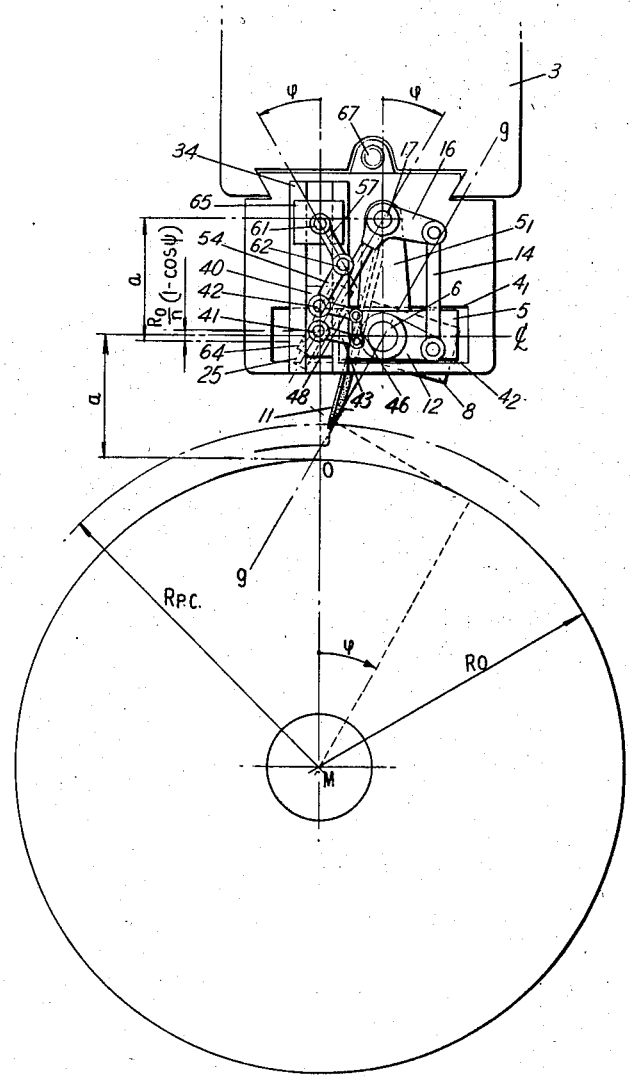

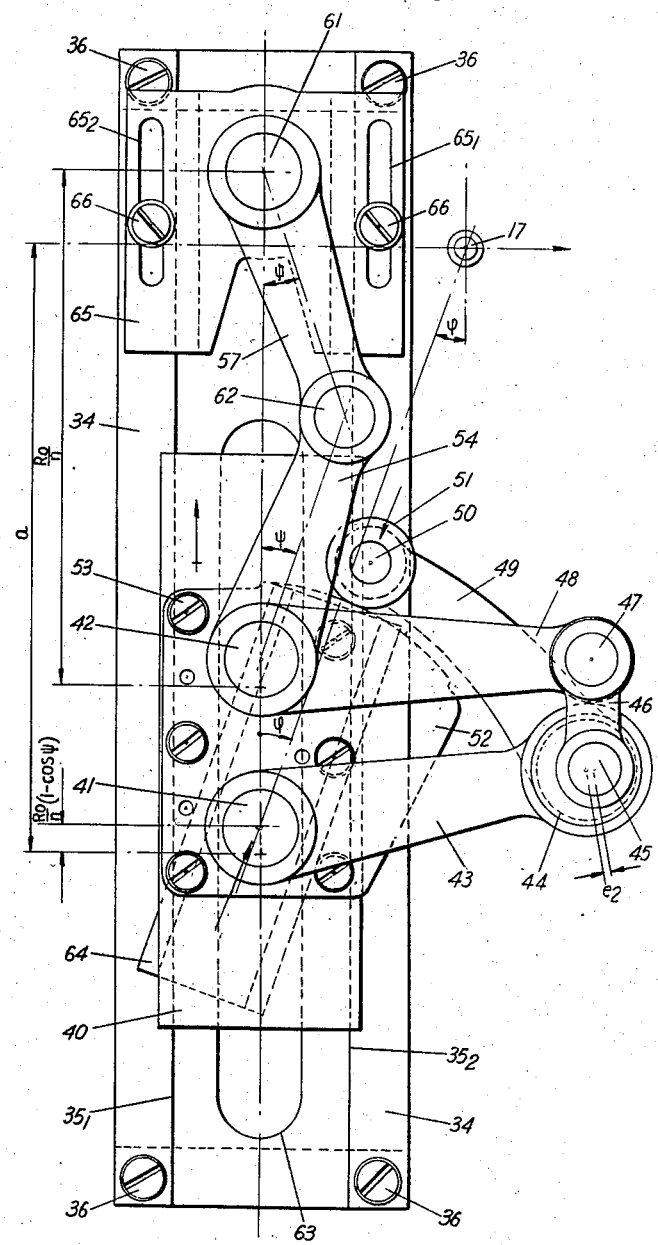

June 2, 1959 P. H. CLEFF 2,888,784
MEANS FOR GENERATIVELY FINISHING INVOLUTE GEARS
Filed Sept. 7, 1954 23 Sheets-Sheet 16

Inventor
Peter H. Cleff
By Ralph B. Stewart
Attorney

June 2, 1959 P. H. CLEFF 2,888,784
MEANS FOR GENERATIVELY FINISHING INVOLUTE GEARS
Filed Sept. 7, 1954 23 Sheets-Sheet 17

Inventor
Peter H. Cleff
By Ralph B. Stewart
Attorney

June 2, 1959 P. H. CLEFF 2,888,784
MEANS FOR GENERATIVELY FINISHING INVOLUTE GEARS
Filed Sept. 7, 1954 23 Sheets-Sheet 18

Inventor
Peter H. Cleff
By Ralph B. Stewart
Attorney

June 2, 1959  P. H. CLEFF  2,888,784
MEANS FOR GENERATIVELY FINISHING INVOLUTE GEARS
Filed Sept. 7, 1954  23 Sheets-Sheet 19

Inventor
Peter H. Cleff
By Ralph B. Stewart
Attorney

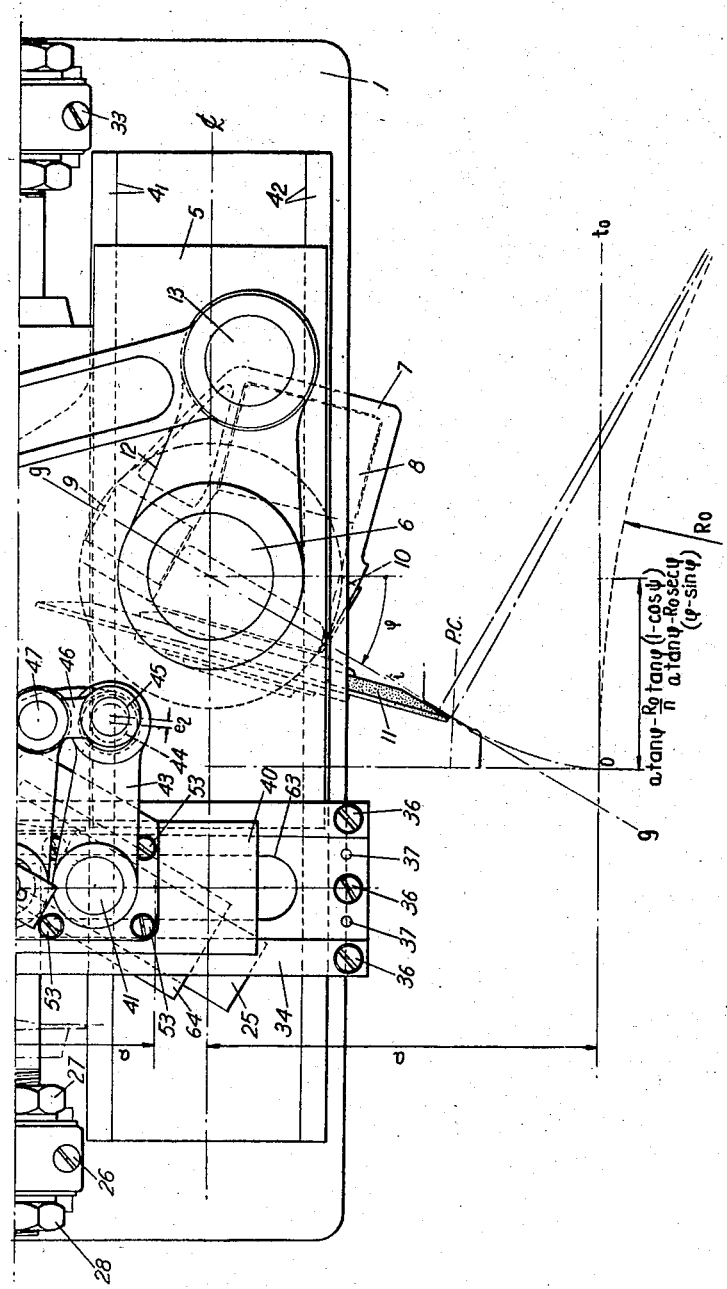

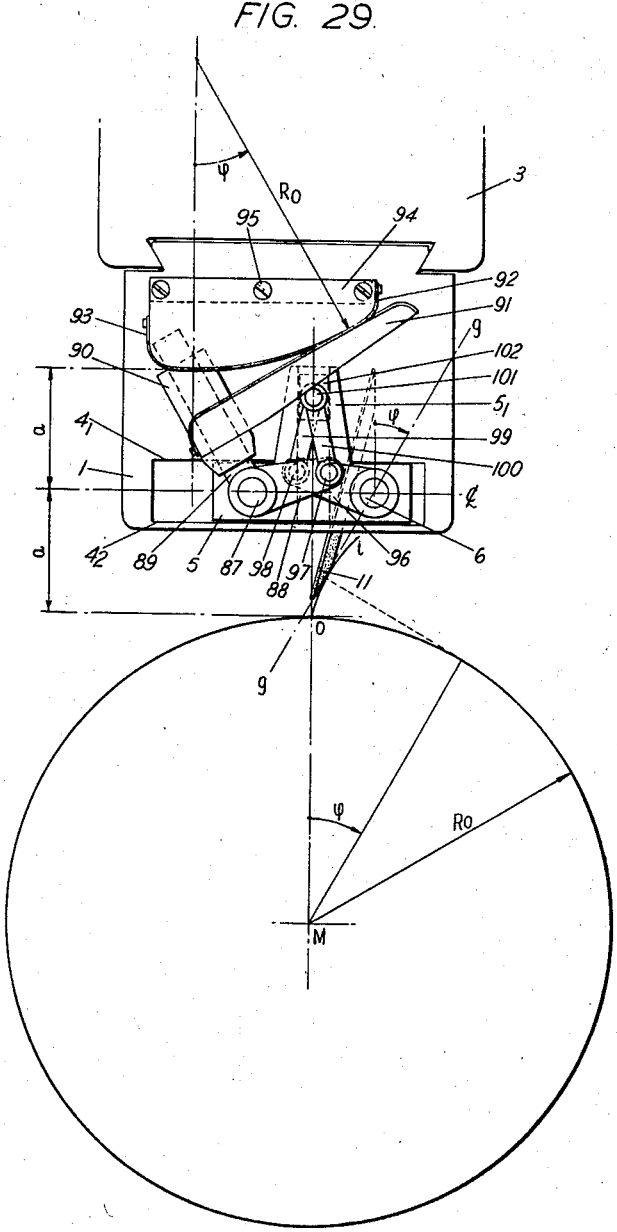

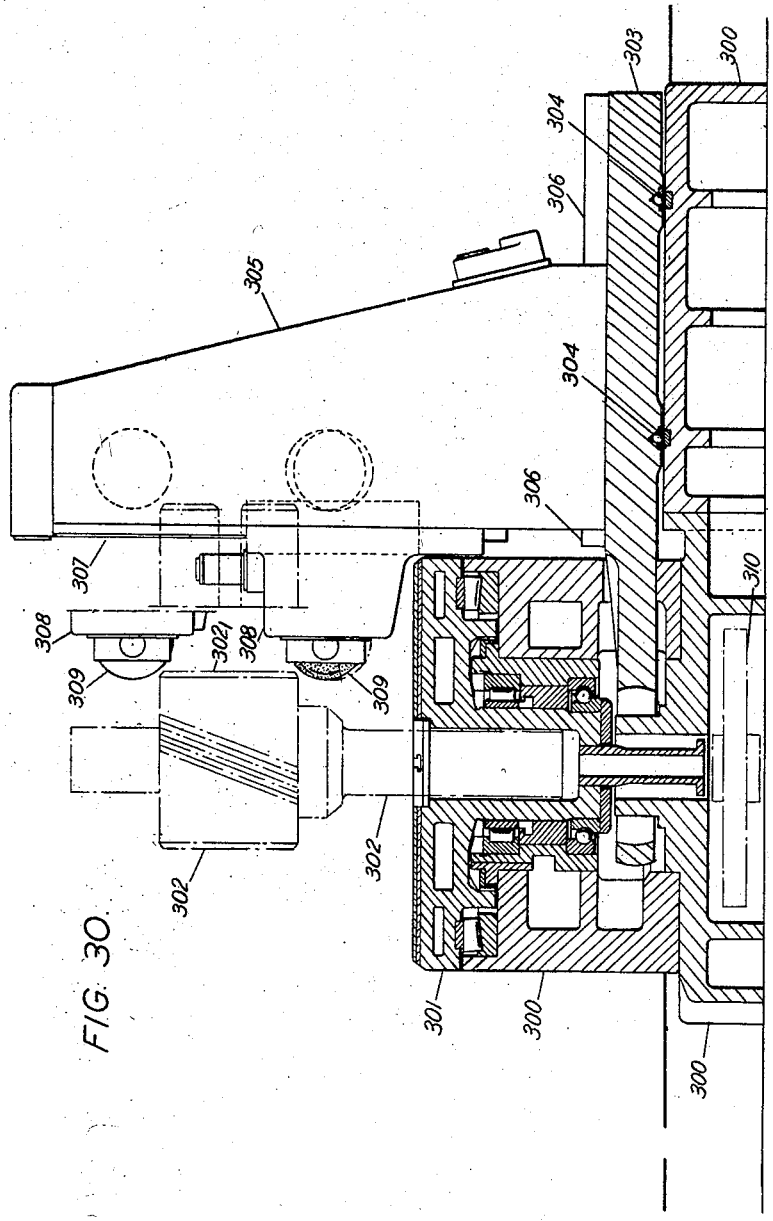

United States Patent Office 2,888,784
Patented June 2, 1959

2,888,784

MEANS FOR GENERATIVELY FINISHING INVOLUTE GEARS

Peter Herbert Cleff, Gosforth, England, assignor to The Commissioners for Executing the Office of Lord High Admiral of the United Kingdom of Great Britain and Ireland, London, England, and The Parsons and Marine Engineering Turbine Research and Development Association, Wallsend, England Application September 7, 1954, Serial No. 454,248

Claims priority, application Great Britain September 8, 1953

17 Claims. (Cl. 51—32)

This invention relates to means for generatively grinding involute gears.

The principal object of the invention is to provide, in connection with the manufacture of high precision involute spur or helical type gears, improved means whereby the gear tooth flanks, having been cut by one of the well known machining operations such as hobbing or planing, may be finished to the desired profile by a profile generating grinding process employing a rotatably driven grinding wheel.

In the generating process, the grinding wheel is guided with an oscillating motion over a distance sufficient to cover the depth of tooth required, basically in such a way that its operative face generatrix envelopes, as a line curve, a true circular involute generated from the gear base circle of radius $R_0$, or a high order approximation thereto, during either the first or second half or during both halves of its cycle of movement. Means is also provided for modifying the path of the wheel so that simultaneously with the basic curve, the grinding wheel produces tooth profile modifications such as tip and/or root relief which might be found necessary or desirable.

A flat side grinding wheel with line contact between tooth flank being ground and said grinding wheel may be used when producing a tooth profile without tip and/or root relief, since there is then no risk of damage to previously ground portions of the tooth flank due to said line contact, but for producing a modified involute profile with tip and/or root relief, a cone-shaped wheel having a relatively narrow periphery and making point contact with a flank of a work piece tooth is preferred, in order to avoid that same risk. The invention will be particularly described hereinafter with reference to a cone-shaped wheel because of its greater utility.

It will be clear that in order to grind over the whole flank of a spur or helical gear tooth and repeat the operation on successive teeth, further correlated movements must be imparted to the grinding wheel and/or the work piece. One object of the present invention is to provide an improved gear grinding machine in which all the required operative movements, i.e. cutting, generation of profile and helix, and feed, are imparted to the grinding wheel, while the work piece (a pinion or gear wheel suitably pre-cut and heat treated) remains stationary during the grinding of one tooth flank and is rotated and indexed only for consecutive tooth flanks to be brought into the correct grinding position relative to the path of generation of the grinding wheel.

The essential part of such a machine provided by the invention is a grinding head, incorporating the grinding wheel and its associated guiding mechanism, and complying with the requirement that all the components of the head—except the operative part of the grinding wheel—must be located and must operate entirely outside the space occupied by the work piece. The remaining part of the machine including e.g. the bed, column, table, and indexing arrangements for the work piece, may be constructed according to known practice in the art.

According to the invention a grinding head for an involute gear grinding machine comprises a rotatable spindle adapted to carry a grinding wheel having a flat or cone-shaped operative face, mounted in a spindle holding member and angularly movable therewith about a main pivot axially normal to and co-planar with the generatrix of the operative face of the grinding wheel, the main pivot being mounted on a main slide slidable on a rectilinear main guide adapted to be positioned perpendicularly to the gear axis and so that the rectilinear path of the main pivot lies a distance "$R_0+a$" from the gear axis (the main pivot axis being parallel to the gear axis), and means for correlating the said angular and rectilinear movements so that, from a datum position, an angular movement $\phi$ of the spindle holding member is accompanied by a rectilinear movement $a. \tan \phi - R_0 \sec \phi(\phi - \sin \phi)$ or a high order approximation thereto of the main pivot slide, whereby the said generatrix is a generatrix also of the true or a nearly true involute generated from the gear base circle of radius $R_0$.

The means for correlating the said angular and rectilinear movements consists of a tangent-mechanism, comprising a tangent-link pivoted at one end to an extension of the main slide and coupled, as to rotation $\phi$, equally to the spindle holding member, the tangent-link having a link sleeve slidable relatively along the link and mounted on a real or a virtual pivot movable relatively to the rectilinear main guide, and control means for moving the link sleeve pivot or pivoting point so that the correlated movement of the main slide measured from its datum position is $a. \tan \phi - R_0 \sec \phi(\phi - \sin \phi)$ or a high order approximation thereto. The movable link sleeve pivot or pivoting point may be adapted to take up a datum position distant "$a$" along the link from the link end pivot when the link is normal to the rectilinear main guide.

Several means for coupling the tangent-link to the spindle holding member are provided. In the preferred means, the tangent-mechanism further comprises a parallelogram linkage wherein the extension of the main slide is a base member of the linkage, two equal and parallel tie-rod-end-connected levers being mounted respectively on the main pivot and the tangent-link end pivot, the levers being rigidly connected respectively to the spindle holding member and the tangent-link.

Or the tangent-mechanism may further comprise two equal circular segments in pure rolling contact with each other, mounted respectively on the main pivot and the tangent-link end pivot and rigidly connected respectively to the spindle holding member and the tangent-link.

Or the tangent-mechanism may further comprise two identical slider-crank mechanisms, having a common slide in the medial plane between the main pivot and the tangent-link end pivot and consisting of two equal cranks respectively mounted on and rigidly connected to the main pivot and the tangent-link end pivot, and two equal connecting rods movably joining each of the said two cranks to the common slide.

It will be convenient to regard the expression $a. \tan \phi - R_0 \sec \phi(\phi - \sin \phi)$ for the correlated main slide movement as containing a term $a. \tan \phi$ due to the tangent-mechanism and an involute remainder term due to the control means, and to transform the involute remainder into an expression related to the movement of the link sleeve pivot depending on the motion of the said sleeve.

In the preferred form of the control means, the link sleeve pivot is a real pivot mounted on a control slide constrained by a rectilinear control guide to move in a path normal to the main guide, and which may be controlled so that its movement from the datum position corresponding to a rotation $\phi$ of the tangent-link is given by the transformed involute remainder $R_0$ cosec $\phi(\phi - \sin \phi)$ or a high order approximation thereto.

In another form of the control means the link sleeve pivot is again a real pivot mounted on a control slide constrained by a rectilinear control guide to move in a path parallel to the main guide, and which may be controlled so that its movement from the datum position corresponding to a rotation $\phi$ of the tangent-link is given by the involute remainder $-R_0$ sec $\phi(\phi - \sin \phi)$ or a high order approximation thereto. No transformation of the involute remainder is necessary in this case.

In a third control means the link sleeve is virtually pivoted about an instantaneous centre by means of a control slide fixed normally to the link sleeve and constrained as to one of its freedoms by a rectilinear control guide formed diametrally in a turntable centred on and turnable about a fixed centre. In the preferred form of this means, the fixed centre is on the line of the tangent-link in the datum position of the mechanism, and the control slide and turntable are together controllable so that a rotation $\phi$ of the turntable from its datum position is accompanied by a translation of the control slide along the control guide from the fixed centre given by the transformed involute remainder $R_0(\phi - \sin \phi)$ or a high order approximation thereto.

In a fourth control means the link sleeve has a straight edge fixed to it and is virtually pivoted thereby on a fixed roll generator.

It can be shown that the true involute remainder $R_0$ cosec $\phi(\phi - \sin \phi)$ can be replaced, fairly closely, by a substitute involute remainder of the form $R_0/n$ $(1 - \cos \phi)$; similarly $R_0$ sec $\phi(\phi - \sin \phi)$ can be replaced by $R_0/n$. tan $\phi(1 - \cos \phi)$, and $R_0(\phi - \sin \phi)$ by $R_0/n$. sin $\phi(1 - \cos \phi)$ where $n$ is a constant; and that the substitute remainders can readily be mechanised by a simple mechanism such as an isosceles slider crank. The closeness of the substitution depends, within limits, on the numerical value assigned to $n$.

According to another feature of the invention, the control means further comprises a substitute involute remainder mechanism, such as an isosceles slider-crank mechanism, in driving connection with the control slide, and a computor operable from the tangent-link sleeve for computably driving the substitute remainder mechanism so as to compensate for the difference between the real and substitute involute remainders. In preferred embodiments of the control means as a whole, and in which the control guide is normal to the main guide, the substitute remainder mechanism comprises an isosceles slider-crank mechanism, having a connecting rod pivoted on the control slide and a crank on a pivot fixed relatively to the guide, each being of length $R_0/2n$ where $n$ is between 2.6 and 3.0 and arranged to lie in a straight line with the control guide when in the datum position, and the computor comprises means operable from the tangent-link sleeve for computably driving the connecting rod so that a rotation $\phi$ of the tangent-link is accompanied by a rotation $\psi$ of the connecting rod such that $(1 - \cos \psi) = n$ ($\phi$ cosec $\phi - 1$) or a high order approximation thereto.

The computor may comprise a cam or link device, or a combined cam and link device, adapted to drive the substitute remainder mechanism computably from the tangent-link sleeve.

Overriding movement control means such as an eccentric double pivot operable by a cam and follower may be incorporated at the tangent-link end pivot or in the computor, for the purpose of introducing any desired tooth profile modification.

Means is further provided by the invention for generatively producing a computor cam profile in accordance with the equation $(1 - \cos \psi) = n$ ($\phi$ cosec $\phi - 1$).

In order that the invention may be fully understood in all its aspects it will now be described, by way of example, with reference to the accompanying drawings: of which those showing the grinding head and parts thereof are all plan views looking in the direction of the axis of the work piece, and wherein:

Figure 7 is a diagram illustrating the basis of the preferred control means.

Figures 8 and 9 respectively are diagrams illustrating the basis of alternative control means.

Figure 10:
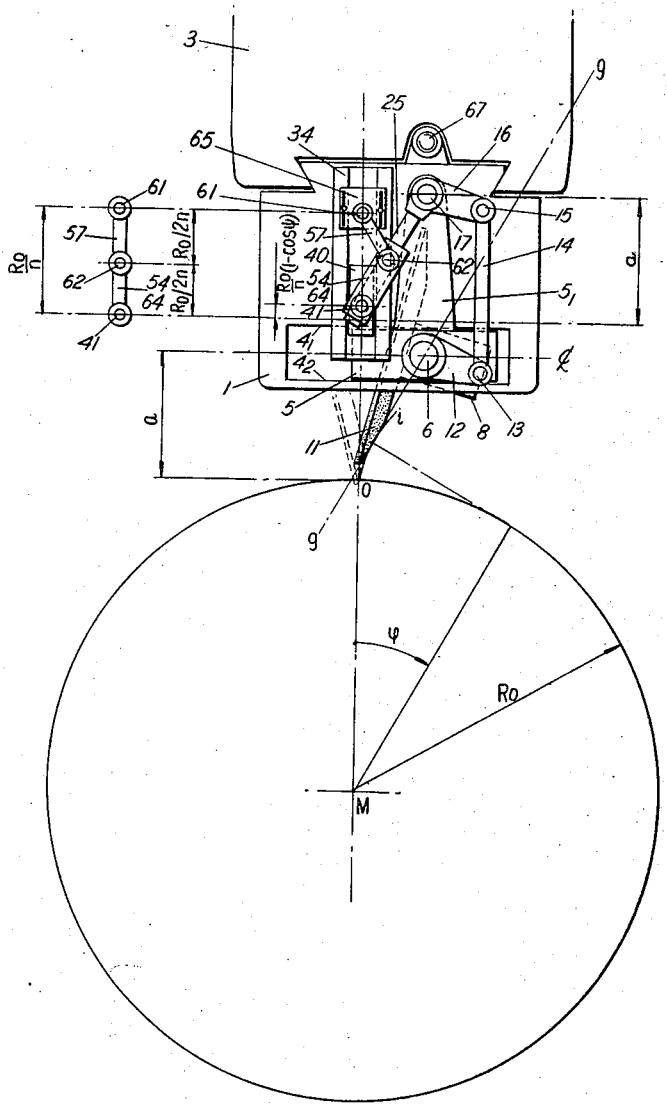

Figure 10 shows the substitute remainder mechanism in driven connection directly with the tangent-link, without computor.

Figure 11:
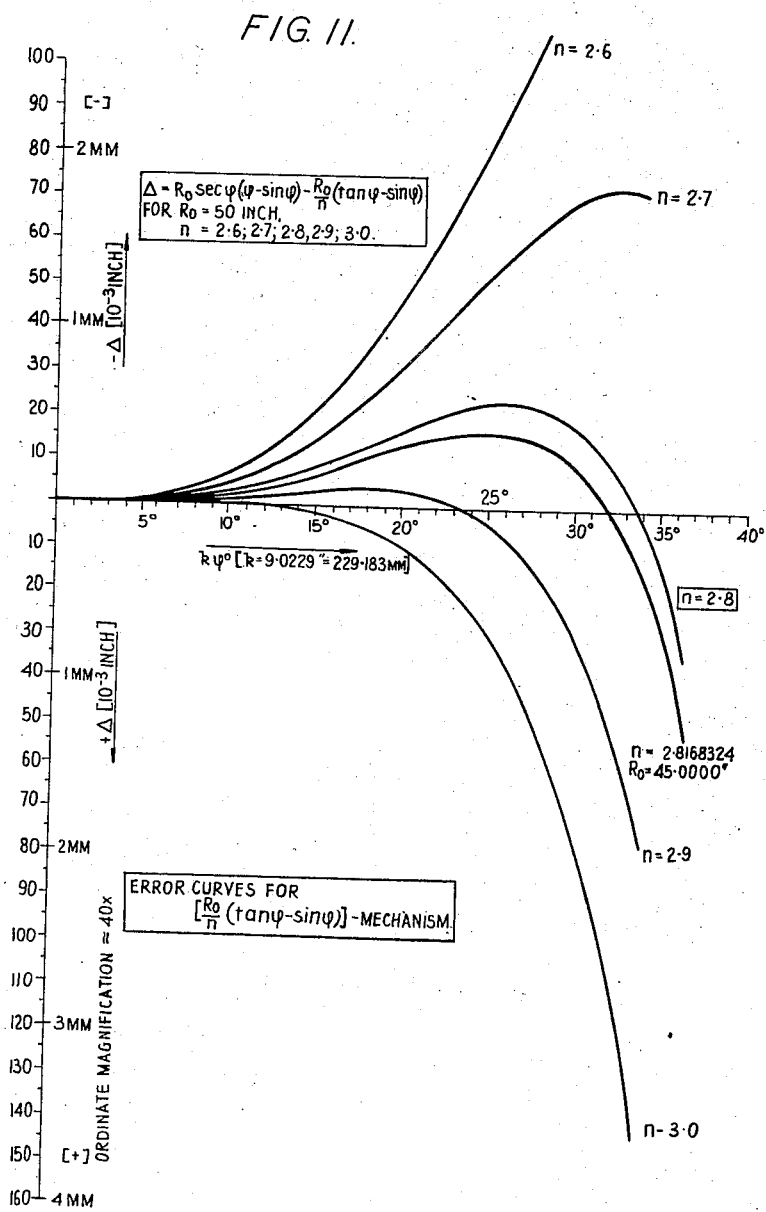

Figure 11 is graphical and shows the deviation $\Delta$ between the true and substitute (or actual) positions of the main slide, for the mechanism of Figure 10.

Figure 12:
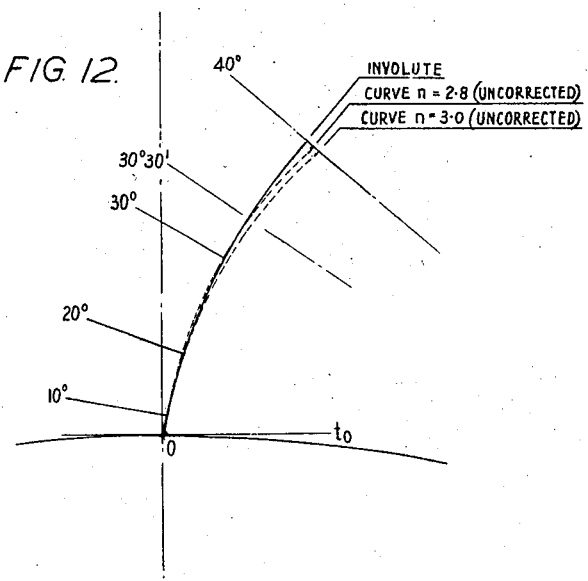

Figure 12 shows different types of tooth profiles producible by the mechanism of Figure 10.

Figure 13 is a graph showing the deviation $\delta$ between $\psi$ and $\phi$ for $n = 2.8$.

Figure 14 is a line diagram of the tangent-mechanism showing the effect of approximations in the computor on the tooth profile.

Figure 15 is a graph showing the (negative) tolerance $\Delta \psi$ permissible for $\psi$ for different values of $\phi$ and a given maximum profile inaccuracy $\epsilon$ at the end of a given $\phi$ range of the grinding head.

Figure 16 shows a cam type $\psi/\phi$ computor in driven/driving connection between the tangent and substitute remainder mechanisms respectively of Figure 10.

Figure 17:
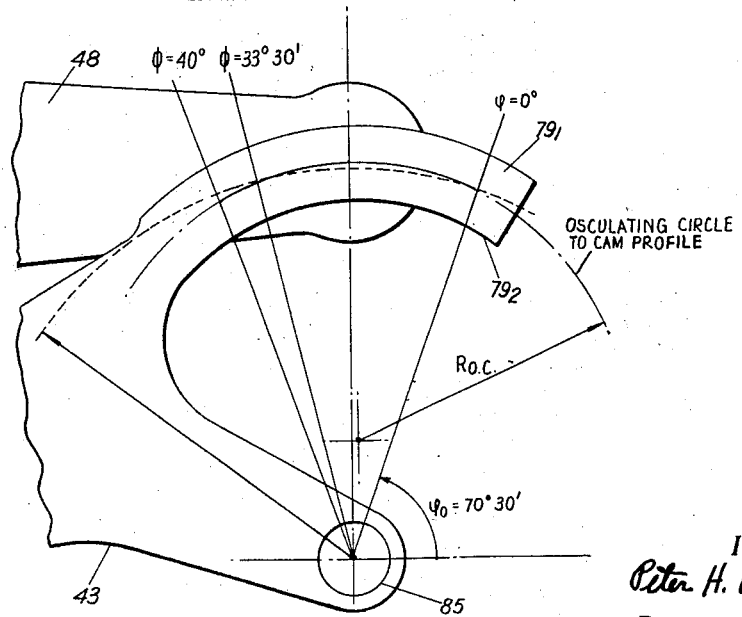

Figure 17 is a diagram showing the basis of a cam profile for the computor of Figure 16.

Figure 18 shows a $\psi/\phi$ levers-and-link computor in driven/driving connection between the tangent and substitute remainder mechanisms respectively of Figure 10.

Figure 19 shows another $\psi/\phi$ levers and link high-order-approximation computor, with means for introducing tooth profile modifications.

Figure 20:
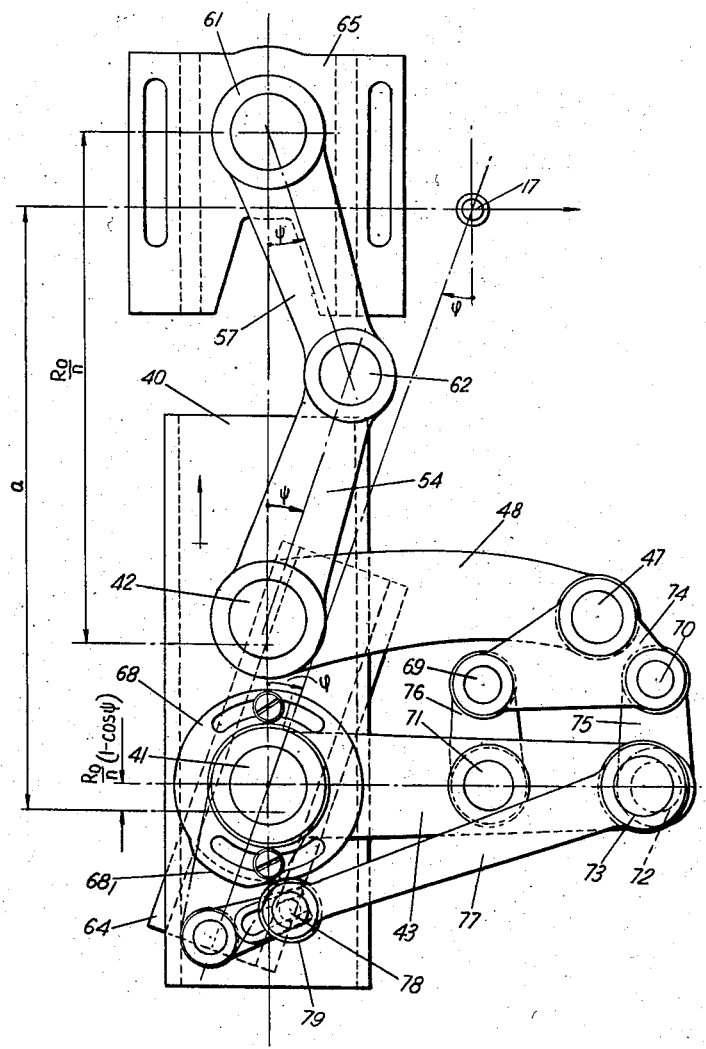

Figure 20 shows a combined $\psi/\phi$ levers and link plus cam computor.

Figures 21 to 25 show variants of the computer mechanism.

Figure 26 is a diagram of a mechanism adaptable for the generative production of the cam profile illustrated in Figures 16 and 17.

Figure 21:
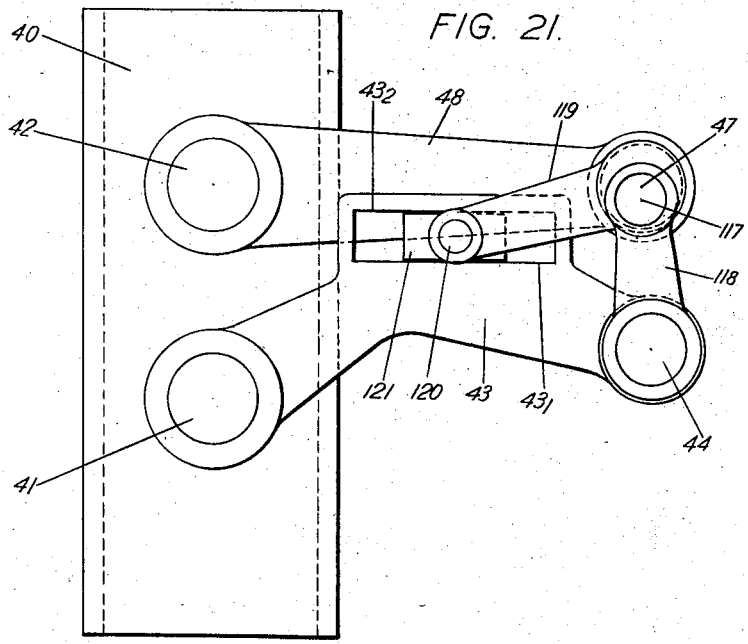
Figure 27:
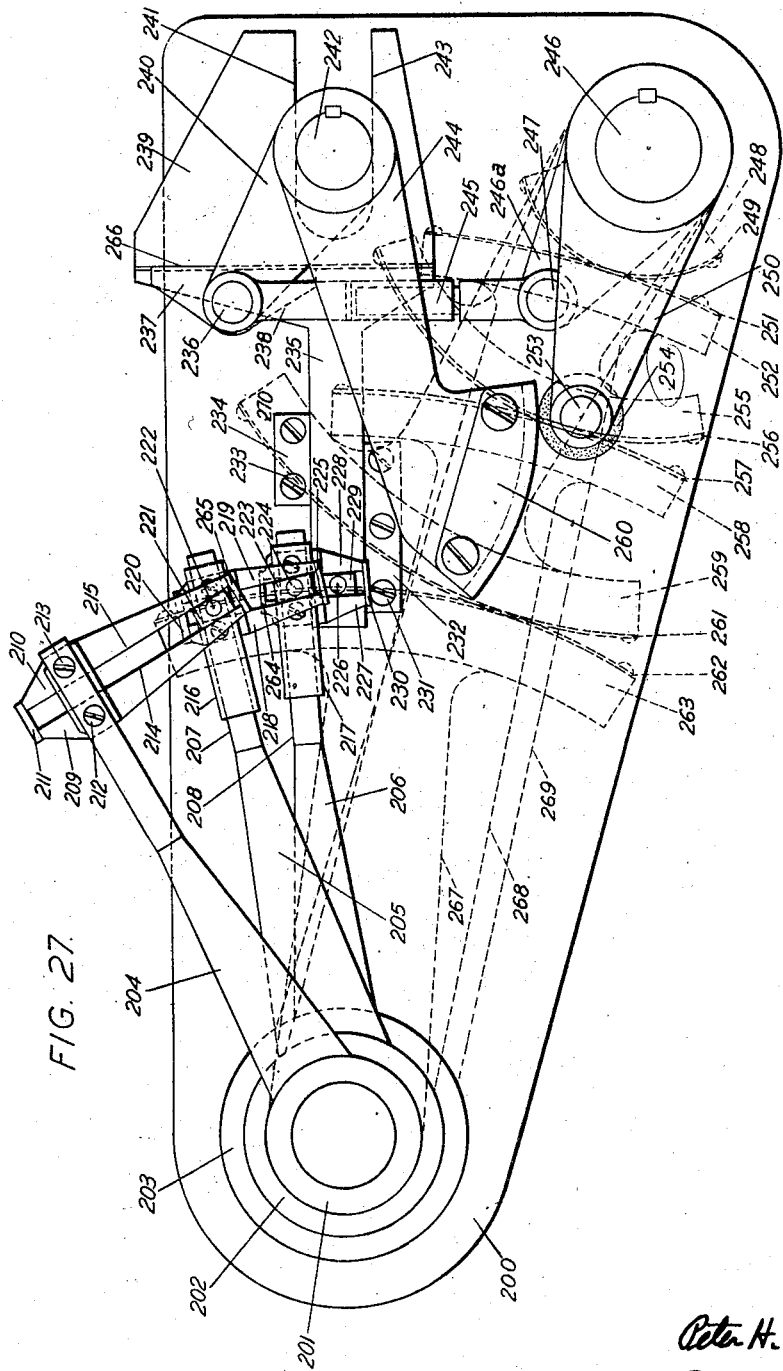

Figure 27 is a plan view of a cam grinding machine based on the mechanism of Figure 21.

Figure 28:
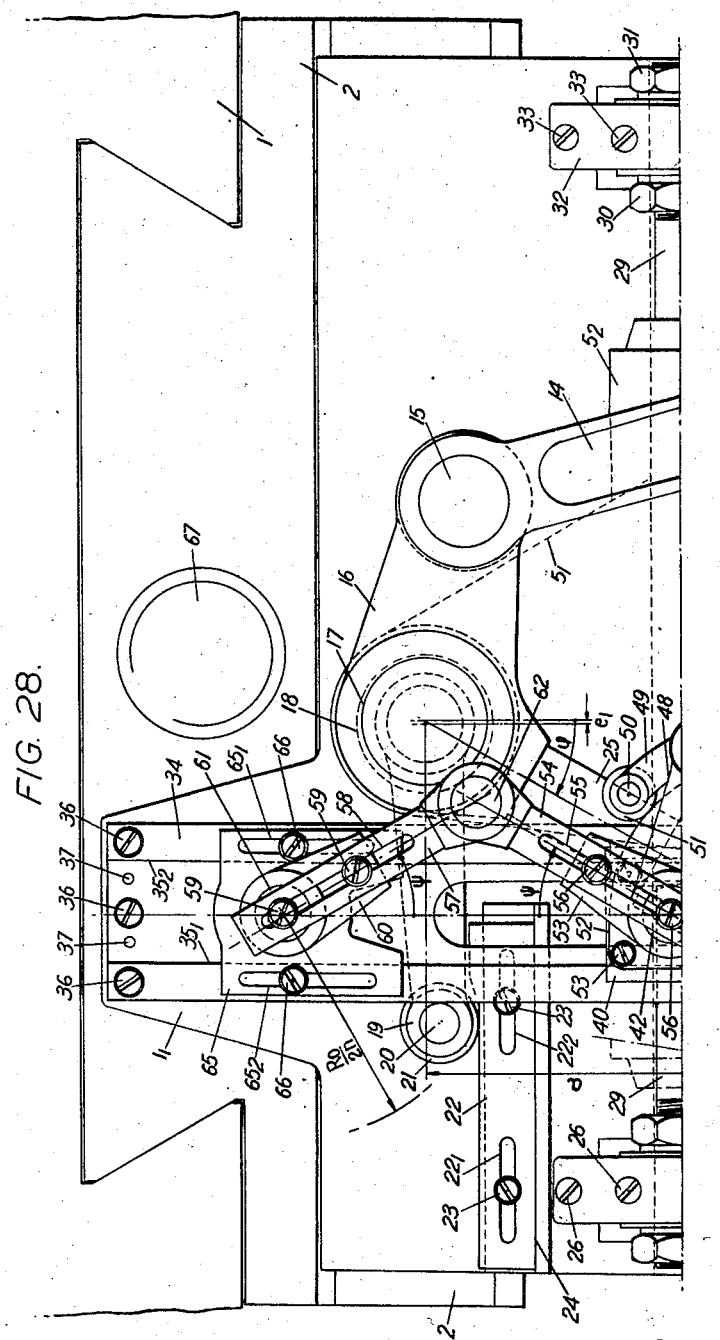

Figure 28 is a plan view illustrating a portion of a complete gear grinding machine head suitable for grinding spur or helical type gears.

Figure 28A is a plan view illustrating the remainder of the complete gear grinding machine shown in part in Figure 28.

Figure 29 is a partly diagrammatic plan view of a grinding head employing a circular/straight line roll generator control means.

Figure 30 is a part-sectional view in elevation of a complete gear grinding machine.

Like parts throughout the figures are designated by like reference numerals.

Figure 1:
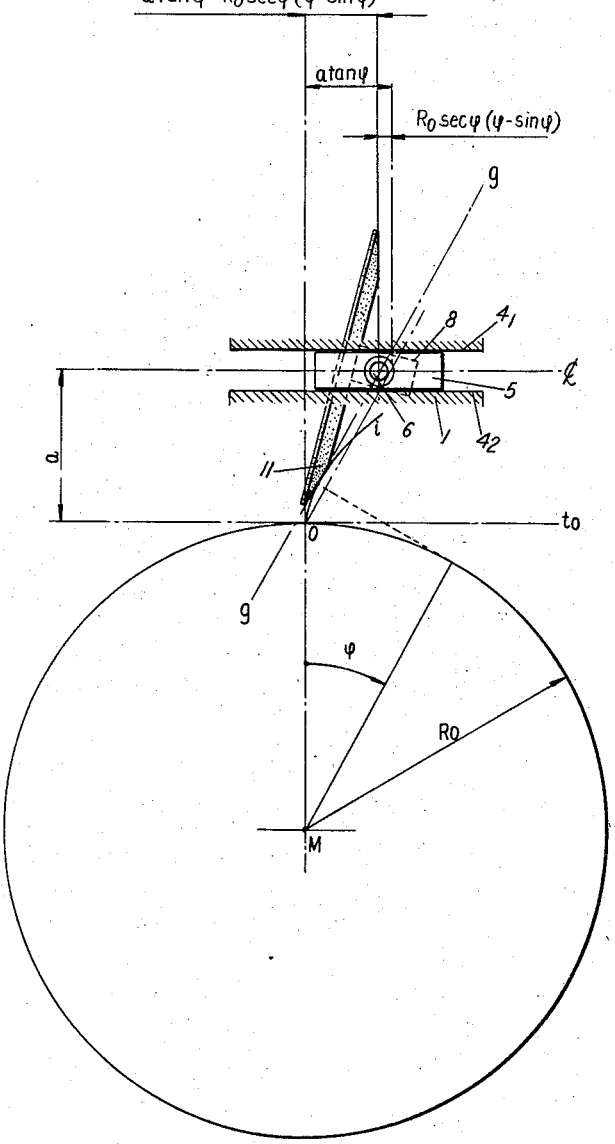
Figure 1 is a diagram illustrating the principle of involute generation underlying the invention.

Referring to Figure 1, a rotatable spindle carrying a grinding wheel 11 having a cone-shaped operative face with an apex angle of about 150°, is mounted in a spindle holding member 8 and is angularly movable therewith about a main pivot 6 axially normal to and co-planar with a generatrix $gg$ of the operative face of the grinding wheel (as the latter rotates). The main pivot 6 is mounted on a main slide 5 slidable in a rectilinear main guide $4^1$—$4^2$ positioned perpendicularly to the axis M of a gear having a base circle radius $R_0$ and so that the rectilinear path of the main pivot 6 lies a mutually perpendicular distance $R_0+a$ from the gear axis M (the axis of the main pivot 6 being parallel to the gear axis M). In the datum position the main pivot 6 will lie on the vertical centreline of the figure. It will be seen that when the angular and rectilinear movements of the grinding wheel are correlated so that from the datum position, an angular movement $\phi$ is accompanied by a rectilinear movement $a. \tan \phi - R_0 \sec \phi \ (\phi - \sin \phi)$, then the generatrix $gg$ will be a generatrix also of an involute $i$ generated from origin O on the base circle $R_0$.

It should be pointed out that $\phi$ is the involute angle measured from a line passing through the centre M and the origin O, and is related to the pressure angle $\alpha$ of the gear by the relationship $$\phi = \alpha + (\tan \alpha - \alpha) \text{ or } \phi = \alpha + \text{inv } \alpha$$

where $\alpha$ is either the normal or transverse pressure angle depending on whether the gear in question is a spur or helical gear respectively.

Figure 2:
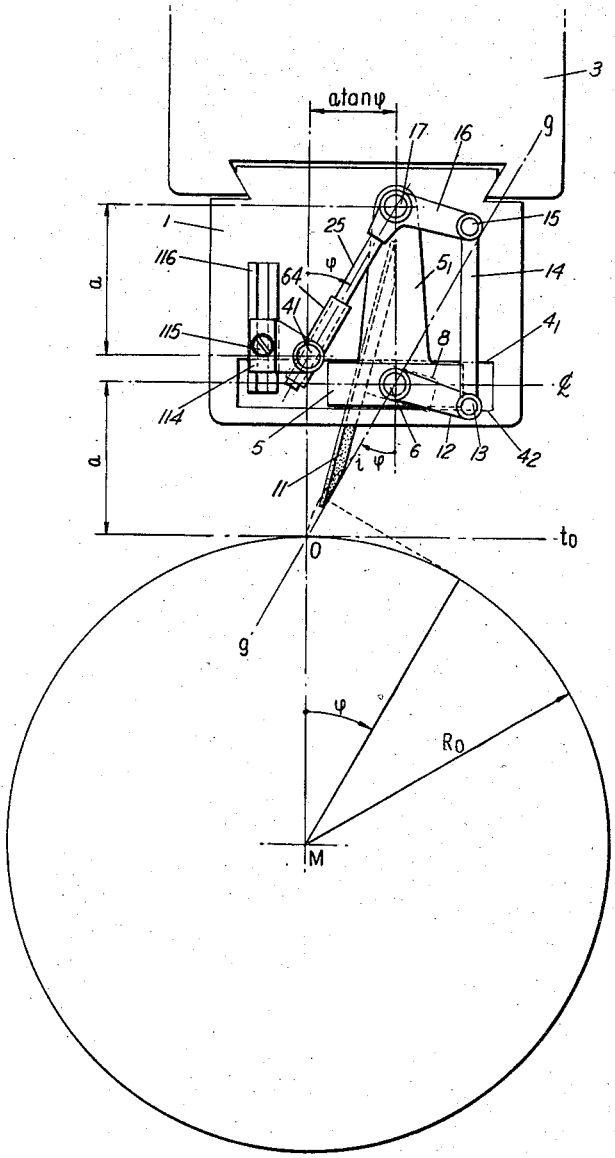
Figure 2 is a diagrammatic view of the preferred tangent-mechanism illustrating the principle thereof.
Figure 3:
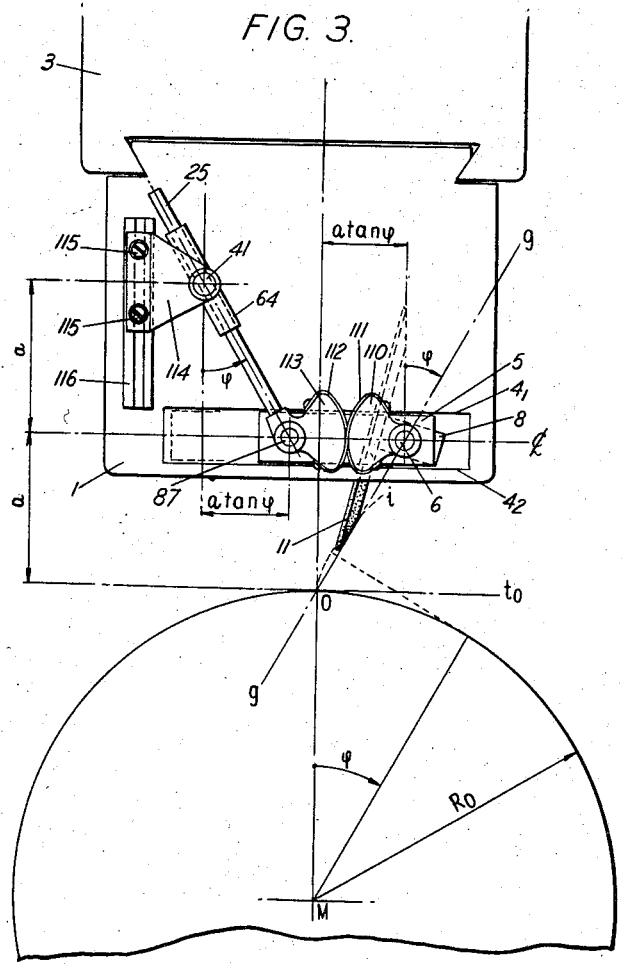
Figures 3 and 4 are diagrammatic views of alternative tangent-mechanisms illustrating the principles thereof.
Figure 4:
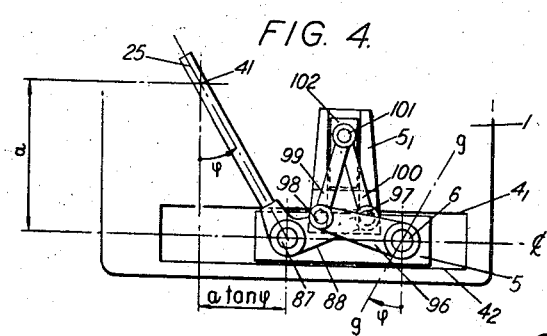

In the grinding head, the $a. \tan \phi$ term of the main slide movement may be mechanized by one of the tangent-mechanisms shown in Figures 2, 3 and 4.

The preferred tangent-mechanism is shown in Figure 2, mounted on a main frame 1 adapted to form a feed slide slidably mounted on column 3 of an actual gear grinding machine. Guide ways $4^1$—$4^2$ of the main frame 1 carry the main slide 5 with integral main pivot 6 on which the grinding wheel spindle holding member 8 is mounted. Slide 5 is provided with a vertical extension $5^1$ which carries, an a pivot 17 at its upper end, the tangent-link 25, integral with a bell-crank lever 16 forming one member of a parallelogram linkage based on the extension $5^1$, the remaining two members of the linkage comprising a lever 12 on main pivot 6, in driving connection with the spindle holding member 8, and a connecting rod 14 pivotally connecting the ends of the levers 16 and 12. The tangent-link 25 is slidably held in a sleeve 64 which in turn is rotatably mounted on a pivot 41. For purposes of explanation only, the pivot 41 is shown to be fixed relatively to the main frame 1 on the vertical centreline of the figure which is the datum position for the tangent-link 25. The vertical distance between the (assumed) fixed pivot 41 and the tangent-link end pivot 17 is "$a$."

In another tangent-mechanism shown in Figure 3 similarly mounted on the main frame 1, the tangent-link 25 is pivoted at its lower end on a pivot 87 carried on a horizontal extension of the main slide 5. In this case rotation $\phi$ of the tangent-link is transmitted equally and oppositely to the spindle holding member by means of two complementary circular segments 110 and 113 mounted respectively on the main pivot 6 and the tangent-link end pivot 87 and rigidly connected respectively to the spindle holding member 8 and the tangent-link 25. Pure rolling contact is established between the circular segments 110 and 113 by means of steel tapes 111 and 112 in known manner.

A third tangent-mechanism shown in Figure 4 comprises, in addition to the main guide $4^1$—$4^2$, main side 5, main pivot 6, and tangent-link 25 (pivoted on a horizontal extension of the main slide 5), two identical slider-crank mechanisms with a common slide 102 which is free to move along straight guide ways located in a vertical extension $5^1$ of the main slide 5. Two equal connecting rods 100 and 99 are pivotally mounted together on slide 102 and their lower ends are pivoted respectively to two equal cranks 96 and 88 mounted respectively on the main pivot 6 and the tangent-link end pivot 87, the cranks being rigidly connected respectively to the spindle holding member 8 (not shown in this figure) and the tangen-link. The position of the (assumed) fixed pivot 41 of the tangent-link sleeve 64, distant "$a$" vertically from the centre of the main guides $4^1$—$4^2$, is indicated.

It will be clear by inspection of Figures 2, 3 and 4 that when the mechanism is moved from the datum position (in which the tangent-link 25 is vertical) into the position shown in each of the figures, a rotation of $\phi$ of the tangent-link 25 is accompanied by an equal (and in two cases opposite) rotation $\phi$ of the spindle holding member 8, and by a translation $a. \tan \phi$ of the main pivot 6 along the main guides $4^1$—$4^2$ from the datum position.

Figure 6:
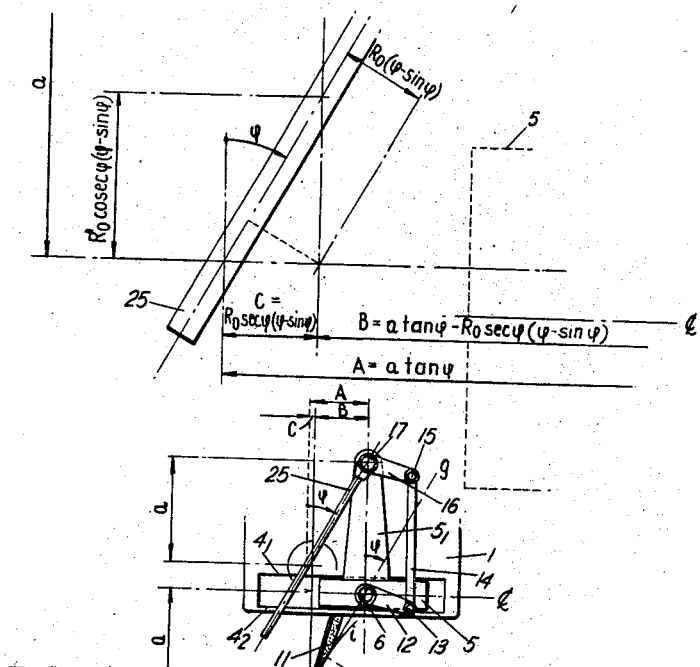
Figure 6 shows part of the tangent-link of Figure 5 on a larger scale.
Figure 5:
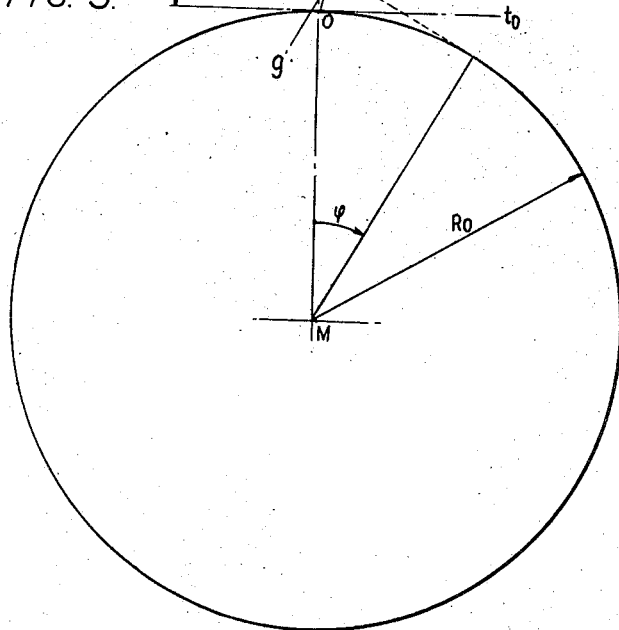
Figure 5 shows the preferred tangent-mechanism again, in order to illustrate the relationship thereto of the control means.

Referring now to Figures 5 and 6, these show a mechanism similar to that of Figure 2 arranged in the correct generating position above a work piece of base circle radius $R_0$ having an involute tooth profile $i$ generated from origin O on the datum centreline of the figures. It will be seen in this case that since the main pivot 6 must have been moved a distance $a.\tan \phi - R_0 \sec \phi \ (\phi - \sin \phi)$, from the datum position and the grinding wheel must have rotated through the correlated angle $\phi$, so the link sleeve pivot 41 (assuming it to be the real pivot 41, previously fixed) must have been moved from its datum position in order to remain on the line of the tangent link 25. In the enlarged view of Figure 6 the point of intersection of the horizontal and vertical centrelines represents the datum position of the pivot 41. One path, for the pivot 41, represented by the involute remainder $R_0 \csc \phi \ (\phi - \sin \phi)$, is along the vertical datum centreline to its intersection with the tangent-link. A second path represented by the involute remainder $R_0 \sec \phi \ (\phi - \sin \phi)$ is along the horizontal centreline towards the left to its intersection with the tangent-link.

Figures 7, 8 and 9 relate to Figure 6 and show three different ways in which control means is applied to move the link sleeve along its chosen path in the required manner. In each figure, the main frame 1 and the tangent-link 25 in its sleeve 64, are shown.

Referring to Figure 7, a pair of straight control guides $35^1$—$35^2$ in the main frame 1 is arranged normally to the main guides $4^1$—$4^2$ (not shown), and a control slide 40 is slidable therebetween. The slide 40 carries the link sleeve pivot 41 on which the link sleeve 64 is pivotally mounted.

Referring to Figure 8, a pair of straight control guides $104^1$—$104^2$ in the main frame 1 is arranged parallel to the main guides $4^1$—$4^2$ (not shown) and a control slide 103 is slidable in the control guides. The slide 103 carries the link sleeve pivot 41.

In Figure 9, a turntable 106 is pivotally mounted on the datum line of the tangent-link 25 and has straight control guides $109^1$—$109^2$ arranged about a diameter of the turntable. A control slide fixed normally to the tangent-link 25 and slidable in the control guides $109^1$—$109^2$ is controllable, in association with the turntable, so as to remain always the correct (perpendicular) distance from its datum position.

In Figure 10, there is shown a tangent-mechanism similar to that described with reference to Figure 2, in driving connection with an isosceles slider crank mechanism applied as a control in the way described with reference to Figure 7. The slider crank mechanism comprises a crank 57 of length $R_0/2n$, on a pivot 61 which is fixed on the datum centreline of the figure in line with the control guide 40 and control slide pivot 41. The outer end of the crank 57 is pivoted on the tangent-link sleeve 64, on a pivot 62 at a distance $R_0/2n$ along the centreline of the tangent-link from the control slide pivot 41. The link sleeve 64 thus forms the connecting rod of the isosceles slider-crank mechanism defined by the pivots 41—61—62.

The fixed crank pivot 61 is positioned so that the crank 57 and connecting rod 64 lie (as illustrated on the left hand side of the figure) in a straight line with the control pivot 41 when the mechanism is in its datum position.

It will be clear from what has gone before that the movement of the control pivot 41 from its datum position due to the complete mechanism of Figure 10 is expressed by the substitute remainder $R_0/n$. $(1-\cos \phi)$, whereas the movement consistent with the generation of a true involute would be $R_0$ cosec $\phi(\phi-\sin \phi)$. Referring these expressions into the horizontal direction, it is seen that the deviation or departure $\Delta$ of the main slide from its true position is $R_0$ sec $\phi(\phi-\sin \phi)-R_0/n.(\tan \phi-\sin \phi)$.

In Figure 11 the deviation $\Delta$ is plotted against involute angle $\phi$ from 0° to 36° for various values of $n$ ranging from 2.6 to 3.0 for a base circle radius $R_0=50$ inches. For $n=3.0$, $\Delta$ is positive, i.e. negative on the tooth profile, and goes from 0.000 to 0.170 inches. For $n=2.8$, $\Delta$ has a negative maximum of about 23.5 at $\phi=26°$ and a positive maximum of about 26.5 thousandths of an inch at $\phi=36°$. Hence the use of a substitute remainder mechanism for which say, $n=2.8$, leaves only a small deviation to be made up by the computor.

The tooth forms resulting from the mechanism of Figure 10 for $n=2.8$ and $n=3.0$ are compared with the true involute in Figure 12, from which it may be noted that for $n=2.8$, the maximum departures from the true involute are positive and negative on the profile and smaller than the unilateral departures for $n=3.0$. In preferred practical embodiments of the invention, therefore, a value of 2.8 for $n$ becomes the grinding head constant.

Assuming now, with reference to Figure 10, that the crank 57 is freed from its pivot on the link sleeve 64 and pivotally joined instead to a connecting rod 54 (illustrated on the left hand side of the figure) occupying the same position as before and having its slider end pivoted on the same pivot 41; it will be apparent that the control pivot 41 can now be moved in the manner consistent with the generation of a true involute, by rotating the connecting rod 54 (its crank end freed from the link sleeve 64) through an angle $\psi$ such that $(1-\cos \psi)=n$ ($\phi$ cosec $\phi-1$). The amounts by which $\psi$ differs from $\phi$, and with which the computor will have to cope, are shown plotted against the involute angle $\phi$ in Figure 13. For a range of from 0° to 39° for $\phi$, the maximum deviations $\delta$ are seen to be approximately $-26.7$ minutes of arc at $\phi=19.5°$ and $+30.7$ minutes of arc at $\phi=39°$, computed for $n=2.8$.

As a preliminary to a particular description of the computor, and in order that the invention may be fully understood and advantageously carried into effect, in the best manner known to the applicants, the line diagram, Figure 14, and graph, Figure 15, are given.

Referring to Figure 14, this shows the tangent-mechanism of Figure 2 (in full line), positioned above an involute tooth profile $i$ generated from origin O, and indicates the corresponding position of the grinding wheel 11 on the profile $i$. The datum line is the vertical centre-line through origin O which intersects the tangent-link 25 at the control pivot 41. Two sets of parallel dotted lines on either side of the link 25 and the involute or grinding wheel face generatrix respectively, indicate deviations of the link 25 and the generatrix from their true positions. These deviations represent the amounts (positive or negative) by which for a given profile error $\pm\epsilon$ an approximate computor may fail to make up fully for the difference $\delta$ between the true correlated $\psi$ and $\phi$ rotations, and may be assumed to include the effect of manufacturing tolerances. The intercepts of the dotted positions of the link 25 on the datum line represent an instantaneous deviation $\pm\Delta_c$ of the control pivot 41 from its true position, while the intercepts of the dotted positions of the generatrix on a line perpendicular thereto represent the corresponding instantaneous tooth profile errors $\epsilon=\pm\Delta_c.\sin \phi$. The sin $\phi$ term in the error $\epsilon$ indicates that the accuracy required in the design and manufacture of the computing mechanism becomes greater towards the higher end of the $\phi$ range.

For the production of high precision gears, the computer should preferably be of an accuracy such that the permissible negative tolerances $-\Delta\psi$, between the true (involute) and the achieved rotations of the $\psi/\phi$-mechanism, shown in Figure 15, are not exceeded. Here $-\Delta\psi$ in minutes of arc is plotted against involute angle $\phi$ for $R_0=44.8$ inches $n=2.8$, and an assumed profile error of $\epsilon=-0.0004$ inch at an involute angle of $\phi=40°$. This diagram also shows that the allowable tolerance $-\Delta\psi$ becomes wider with decreasing $\phi$, reaching $-\infty$ for $\phi=0$.

Referring, now, to the cam type computer shown in Figure 16, this figure shows also the tangent-link 25 in its sleeve 64 mounted on the control pivot 41, which in turn is carried on the control slide 40 between control guides 34. Further shown is the isosceles slider crank mechanism 57—54, similar to that described with reference to Figure 10, except that in this case the connecting rod 54 (its crank end free, it will be remembered, of the tangent-link sleeve) is mounted on a pivot 42 on the control slide 40, spaced apart from the control pivot 41. In the computer itself, a $\phi$-lever 43 on the control pivot 41 is in driven connection with the sleeve 64, while a $\psi$-lever 48 on the pivot 42 is in driving connection with the connecting rod 54 on the isosceles slider-crank. The $\phi$- and $\psi$-levers are connected together by a frame 84 mounted on a pivot 47 at the end of the $\psi$-lever and having its lower end forked over a pin 85 on the $\phi$-lever so that it always remains approximately parallel to the main guide 34. A double cam extension $79_1$—$79_2$ of the $\phi$-lever is movable between follower rollers 80—83 on the frame 84 and the cam computes the relative $\phi$ and $\psi$ rotations of the $\phi$- and $\psi$-levers respectively in accordance with the Formula $1-\cos \psi=n$ ($\phi$ cosec $\phi-1$).

Figure 17 is an enlarged view of the ends of the $\phi$- and $\psi$- levers of Figure 16, showing how the cam faces $79_1$, $79_2$ may be laid off as a template.

A base disc (assumed fixed to the $\phi$-lever) of radius $Cb$ equal to the distance between the pivots 41 and 42 is laid off from the pin 85, and an osculating circle to a point follower corresponding to the centre of the pivot 47, of calculated radius $R_{oc}$, is drawn so as to intersect the base disc at two points corresponding to the zero deviations $\delta$ between the $\psi$- and $\phi$-rotations shown in Figure 14 i.e. at $\phi=0$ and $\phi=33°30'$. The intercept between the base and osculating circles on the disc radius represents a relative angular movement between the $\psi$- and $\phi$-levers equal to the required deviation $\delta$.

Figure 18 shows a complete grinding wheel guiding mechanism comprising a tangent-mechanism as described with reference to Figure 2, in driving connection with an isoceles slider-crank similar to that shown in Figure 16. The computer in this case comprises a $\phi$-lever 43 on the control pivot 41 in driven connection with the link sleeve 64 and a $\psi$-lever 48 on the control slide pivot 42 in driving connection with the connecting rod 54, the $\psi$- and $\phi$-levers being coupled together at their ends by a link 46 which is equal in length to the radius $R_{oc}$ of the osculating cam circle described with reference to Figure 17. The lengths of the $\phi$- and $\psi$-levers 43 and 48 respectively are computed to give as near as is possible the correct angular relationship between the $\phi$- and $\psi$-rotations of the levers 43 and 48. Calculations have shown that this simple form of computer is capable of giving an involute profile accurate to within about $\pm0.00075$ inch.

With reference to Figure 20, the computer shown there includes a four-bar linkage defined by the respective pivots 72, 71, 69 and 70 of which the pivots 69 and 70 are pivoting points for a triangular coupling link 74 having its third pivot 47 mounted on the end of the $\psi$-lever 48. Pivot 69 is connected to pivot 71, which is on the φ-lever 43, by a link 76, while pivot 70 is connected, by a link 75, to pivot 72, the latter being eccentrically mounted on, and made integral with, a profile modification pivot 73 carried rotatably in the end of the φ-lever 43. A profile modification lever 77 has one end keyed to the eccentric pivot 73 and the other end provided with a roller follower 79, bearing, in spring-held contact, one a cam ring 68 having a raised cam face $68^1$, adjustably bolted to the control slide 40. In operation, the rotation of the lever 43 will at a certain pre-set angle cause the follower roller 78 to contact the cam face $68^1$, thus rotating the lever 77 relatively to the φ-lever 43, and causing such kinematical changes in the computer as will introduce the desired modifications to the tooth profile being ground. Figure 20 is drawn approximately to scale in order to illustrate the proportions of an actual computer of this type. Methods of determining the exact dimensions will be obvious to those skilled in the art, without explanation. Provided the relevant dimensions are adhered to with reasonable accuracy, this computer will theoretically give an involute profile accurate to within about —0.00005 inch on a gear base circle of 90 inches diameter.

Coming to Figure 19, the parts of the tangent—and substitute—remainder-mechanisms respectively, and of the control guide and control slide shown there are similar to those shown in Figure 16. The computer in this case comprises a combination of the ψ/φ levers and links 48, 43 and 46 respectively of Figure 18, together with a cam make-up device. The link 46 is mounted on one pivot 45 of an eccentric double pivot 44/45, the other eccentric pivot 44 being rotatable in the end of the φ-lever 43. A make-up cam follower 49 keyed to the eccentric pivot 44 has a follower roller 51 at its end bearing upon a make-up cam 52, which is bolted to the control slide 40. The profile of the cam 52 is adapted so as to rotate the eccentric double pivot 44/45, upon rotation of the φ-lever, as to make up for approximations due to the use of the simple levers-and-link computer and thus enabling a high order of accuracy to be achieved in the process of involute generation. In addition, the make-up cam can be usefully adapted correctly to adjust the complete grinding head mechanism when first assembled, and also later when reconditioning of the head might become necessary; it also permits wider manufacturing tolerances than would otherwise be possible, to be employed in the grinding head mechanism as a whole.

The computer is, however, susceptible of considerable variation, without departing from the spirit and scope of the invention. A number of possible variants, shown in Figures 21 to 25 will now be briefly described. In all these figures the control slide 40, φ-lever 43, and ψ-lever 48, are shown.

The computer of Figure 21 is somewhat similar to that shown in Figure 19. The only difference is the introduction of a slider crank mechanism mounted on the φ-lever 43 and arranged in such a way that the free end of the ψ-lever 48 is directly connected to a pivot 47 in the plane of a connecting rod 119. If, in the mechanism shown, the length of the connecting rod 119 is made equal to that of a crank 118, the mechanism becomes one in which points in the plane of the connecting rod describe ellipses relative to the φ-lever 43. Provided the dimensions of the then isosceles slider crank are selected correctly, a point can be chosen in the plane of the connecting link such that the said point describes either an osculating five point or a five distinct point ellipse replacing the cam profile shown in Figure 17.

Figure 22:
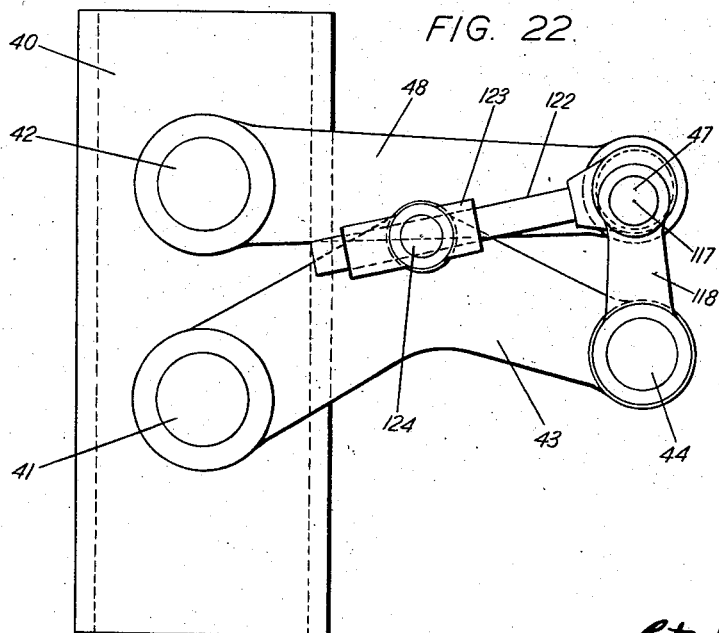

The computer illustrated in Figure 22 is generally similar to that shown in Figure 21, with the difference that instead of a slider crank, a swinging block slider crank is utilised.

Figure 23:
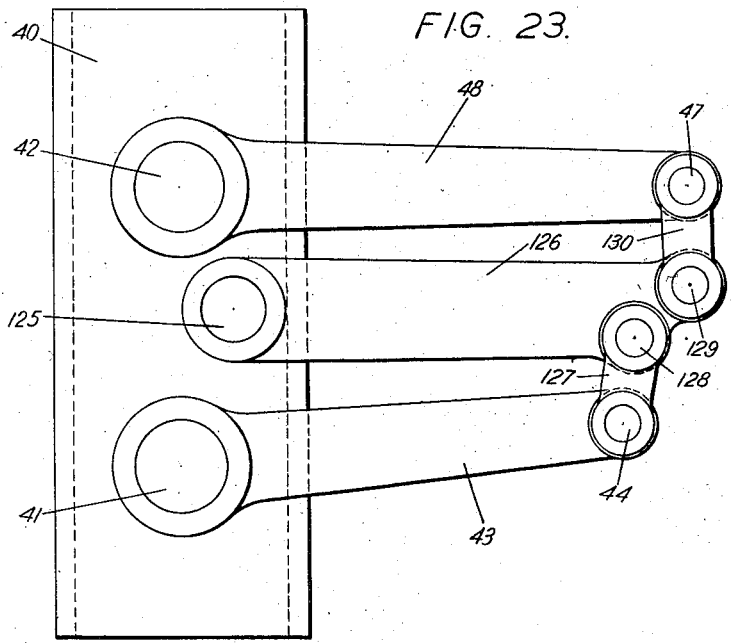

Figure 23 shows a computer in which two four-bar linkages in series are used. The φ-lever 43 transmits through a link 127 a rotation to an arm 126 on a pivot 125 on the control slide 40. The arm 126 then transmits its rotation, which is different to φ, to the lever 48 in the form of a rotation ψ, by means of a second link 130. The pivots 128 and 129 on the end of the arm 126 do not as a rule coincide but are located not only on different radii through the pivot 125 but also different distances away from the pivot 125.

Figure 24:
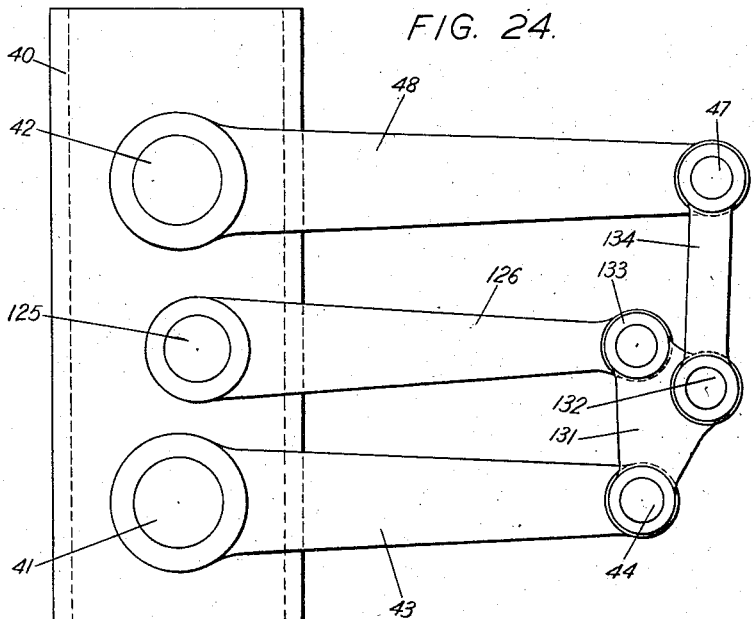

Another computer arrangement shown in Figure 24 is similar to those shown in Figures 19 and 23 in that it is of the six-link seven-pivot type. Rotation φ of the φ-lever 43 is used to operate a four-bar linkage consisting of a base 40, arms 43 and 126, and a coupling link 131. A point 132 in the plane of the link 131 suitably selected, is connected to the end pivot 47 of the ψ-lever 48 by means of another connecting link 134. Movement of the lever 43 will cause the centre of a pivot 132 to describe a complex curve relative to the base (slide) 40 and it is this curve which is utilised to move the lever 48 through an angle ψ.

Figure 25:
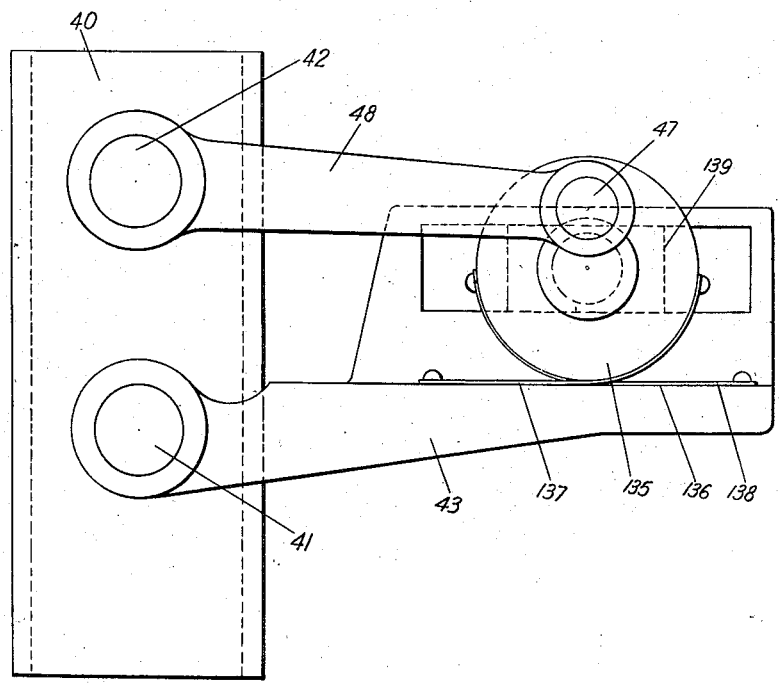

Figure 25 shows a cycloidal computer, in that the end pivot 47 of the ψ-lever 48 is forced to describe a cycloid relative to the φ-lever 43 when the latter is being turned through an angle φ. The operation is such that a rotation of the φ-lever 43 causes not only a rotation of a circular disc 135 round a pivot 140 relative to a block 139, but also—by means of steel tapes 136/137 between the disc 135 and the lever 43—a rectilinear movement of the block 139 relative to the lever 43, both these movements together producing as a resultant the abovementioned cycloidal path of the pivot 47 relative to the φ-lever 43.

Means for generatively producing a computer cam of the type shown in Figures 16 and 17 will now be described.

The mathematical basis of the said cam and of the cam generating means to be employed is derived from the equation $1 - \cos \psi = n(\phi \csc \phi - 1)$ as follows:

Expressing $\phi \csc \phi$ in terms of an infinite series, one can write:

$$\phi \csc \phi = (\sec \phi)/2 . (\sec \phi)/4 .$$
$$(\sec \phi)/8 \ldots (\sec \phi)_{2m}$$

or by limiting oneself to the first two exact terms and combining in a third term the remaining terms up to $m=12$, one obtains:

$$\phi \csc \phi = (\sec \phi)/2 . (\sec \phi)/4 . (\sec \phi)/6.93$$

Although this last expression for $\phi \csc \phi$ is an approximation, the accuracy obtainable in this way is extremely high, the maximum errors being only of the order of ±0.0000005, i.e. only 5 parts in 10 million, for values of φ ranging from 0° to 35°.

Rewriting the first equation gives:

$$(1 - \cos \psi) = n((\sec \phi)/2 . (\sec \phi)/4 . (\sec \phi)/6.93)$$

which is mechanised, according to a feature of the invention, by the mechanism shown diagrammatically in Figure 26.

Referring to the figure, a stationary linear frame 200 carries pivotally at its right-hand end, a ψ-lever 240 of unit length and at its left hand end, on a triple pivot 201—202—203, three arms 204, 207 and 208, each independently rotatable on the triple pivot, the first arm 204 being of length $n$. The intermediate arms 207 and 208 respectively, and the linear frame 200, carry each a composite pivot-slide, denoted respectively by the composite numerals 222/216, 224/217 and 226/235. Three extensions having forked end guides denoted respectively by the compound numerals 209—210, 218—219 and 227—228 extend perpendicularly from the end of the lever 204, the pivot-slide 222/216, and the pivot-slide 224/217, respectively, and engage respectively over the movable pivots 222, 224 and 226 on the intermediate arms and the linear frame.

The slide part 235 of the pivot-slide 226/235 on the frame 200 projects towards the lever 240 and has an end piece 239 with a guide face at right-angles to the frame 200 on which a bearing block 237, pivoted to the end of the lever 240, is arranged to rest in sliding contact.

Assuming now that the three arms 204, 207 and 208 are initially in line with the stationary linear frame 200 and are then rotated through the respective angles $$\left(\frac{\phi}{2}+\frac{\phi}{4}+\phi 6.93\right), (\phi/4+\phi/6.93)$$

and ($\phi$/6.93) into the position shown in the figure, it can easily be demonstrated that the corresponding rotation $\psi$ of the lever 240 is established by the equation $(1-\cos \psi)=n(\phi \cosec \phi-1)$.

Based on the mechanism last described, is the cam generating machine shown in Figure 27, where some parts corresponding to those described with reference to the preceding figure will readily be recognized and need not be elaborated upon. In this machine, the stationary main frame 200 carries, on its horizontal centreline at the right hand side, the $\psi$-lever 240 on its pivot 242 in the frame, and at the left hand side the three arms 204, 207, and 208 on three concentric pivots 201, 202 and 203 also mounted in the frame. The intermediate arms 207 and 208 carry the pivot slides 222/216 and 224/217 respectively, while the third pivot-slide 226/235 now comprises the pivot 226 on a horizontally movable ram 235 constrained between a pair of linear guides 232 and 234 bolted to the frame by bolts 231 and 233 respectively. The ram 235 has a forked head 239 at the right with a vertical guide face 266 on which the base of the bearing block 237, pivoted on the end of the $\psi$-lever 240, rests in sliding contact, inner faces 241 and 243 of the forked head being engaged over the $\psi$-lever pivot 242 and acting as horizontal steadying guides for the ram 235. The extensions perpendicular to the three arms consist of pairs of straight guides 214—215, 218—219 and 227—228 respectively fixed to the outer arm 204 and the slides 216 and 217 of the intermediate arms 205 and 206, and engaged over guide blocks 221, 223 and 229 on the respective pivots 222, 224 and 226.

On a lower pivot 246 at the bottom right of the figure, a $\phi$-lever 246$^a$ is keyed, together with three circular segments 248, 255 and 259 each of different radius adapted to transmit to its corresponding arm 206, 205 or 204 a corresponding rotation ($\phi$/6.93), ($\phi$/4+$\phi$/6.93) or ($\phi$/2+$\phi$4+$\phi$/6.93), for a rotation $\phi$ of the $\phi$-lever 246$^a$, by means of steel-tape-connected complementary circular segments 262, 258 and 263 in driving connection with the respective arms 206, 205 and 204.

The $\phi$- and $\psi$-levers 246$^a$ and 240 are key-connected respectively to a grinding wheel holding lever 250 and a cam holding lever 244, on the respective frame pivots 246 and 242, adapted so that a grinding wheel 254 on the end of the holding lever 250 is in generative contact with a cam plate 260 on the end of the holding lever 244. A two-part spring-extensible link 238—245 resiliently connecting together the end pivots of the $\phi$- and $\psi$-levers respectively, helps to maintain the contact, by keeping the bearing block 237 firmly on the guide face 266.

In operation, a rotation $\phi$ imparted to the lower right pivot 246 necessarily results in a corresponding rotation $\psi$ of the upper right pivot 242 or vice-versa, in accordance with the relation $(1-\cos \psi)=n (\phi \cosec \phi-1)$, whereby a cam face may be generated on the cam plate 260, similar to the cam described with reference to Figures 16 and 17. It will further be seen that in order generatively to produce the double profile cam 79$^1$—79$^2$ shown in Figure 16, the arrangement of $\psi$- and $\phi$-levers shown there must be bodily transferred to the cam grinding machine of Figure 22 in place of the grinding wheel holding lever 251 and the cam holding lever 244 respectively, and so that a pair of corresponding grinding wheels on the grinding wheel holding lever takes the place of the follower rollers 80 and 83.

The complete gear grinding machine head shown in Figure 28 will now be described, with special reference to features not already covered in detail. Referring to the figure a main head frame 1 is mounted on a feed slide 2 movable in known manner (in a direction perpendicular to the plane of the paper) in the machine ways of column 3 by means of a feed screw 67, thus enabling the grinding wheel to be fed across the full face width of the gear being ground. The main frame has a horizontal opening at the bottom forming a pair of main guides 4$^1$—4$^2$, and above these towards the left, a pair of vertical control guides 35$^1$—35$^2$ (on a base member which has a vertical opening 63 to allow clearance for the movable parts), bolted to the frame by bolts 36. The main guides 4$^1$—4$^2$ carry the main slide 5 with its main pivot 6 perpendicular to the plane of the paper, on which is pivotally mounted a spindle unit holding member or cradle 7, holding an air-turbine-driven spindle unit 8, including the cone-shaped grinding wheel 11, so that the operative face of the wheel as it rotates brushes the generating line gg of the involute tooth profile $i$. The spindle unit 8 is adjustable in its cradle 7 on pivot 9 and 10 coaxial with the generating line $g$—$g$, whereby the wheel can be set to the desired helix angle when grinding a helical gear. An extension bracket 5$^1$ of the main slide 5 carries a tangent-mechanism the parts of which will be recognized and which is similar in principle to that already described with reference to Figure 2, and shown in other figures. In the present mechanism however, the bell-crank end 16 of the tangent link is carried on one pivot 17 of an eccentric double pivot 17—18 of eccentricity indicated by the dimension "$e$" in the figure. The other eccentric pivot 18 is journalled in the top of the extension bracket 5$^1$ and is rotatable therein by a lever 19 carrying on its end a roller 21 bearing upon a horizontally disposed cam bar 22 fixed against a ledge 24 on the main frame 1. The cam bar 22 is adjustable along the ledge 24 and held by screws 23 through slots 22$^1$, 22$^2$ in the bar. By this means, additional or overriding movements may be introduced into the generating mechanism in timed relation to the motion of the main slide 5 for the purpose of making tooth profile modifications.

The bracket and slide 5$^1$—5 can be given a reciprocatory motion by a moving cylinder/fixed piston hydraulic unit consisting of a cylinder 5$^2$ integral with the bracket 5$^1$ and a piston (not shown) housed in the cylinder 5$^2$ and having a through-piston rod 29 fixed at both ends to the main frame 1 by anchor blocks 32 and 32$^a$ and piston rod nuts 27, 28, 30 and 31.

The tangent-link 25 (of rectangular cross-section) is slidable in a box sleeve 64 pivoted on the control pivot 41 attached to the control slide 40 slidable in the vertical guides 35$^1$—35$^2$. A second pivot 42 on the control slide 40 carries the slider end of a two-piece length-adjustable connecting rod 54—55 connected to the outer end of a similarly adjustable crank 57—60, the inner end of the crank 57—60 being carried on a fixed anchorage 65 which is adjustable vertically on the control guides 35$^1$—35$^2$ by means of slots 65$^1$—65$^2$ and screws 66: the parts 54 and 57 of the connecting rod and crank respectively are slotted bar members adjustable also similarly by their slots 54$^a$ and 58.

The technique of adjusting and setting up the grinding head as a whole for operation upon different workpieces will, with the aid of the foregoing description, be understood by the skilled reader. While such a head is especially advantageous for a large machine, in that it is adaptable simply by adjustment to produce a range of gears, without the substitution of costly parts such as roll generators in accordance with different gearing specifications, the grinding head shown next in Figure 29 may with advantage be employed in smaller machines for producing small pinions or gears, and where the size (and cost) of a set of roll generators for different base circle gears might be acceptable.

Referring to Figure 29, a tangent-mechanism similar to that described with reference to Figure 4, mounted on its main and auxiliary pivots 6 and 87 respectively on the main slide 5, has a tangent-link 89 held in a sleeve 90 to which a straight edge 91 is fixed at right-angles so as to take up a position parallel to and the distance "$a$" from the centreline of the main slide when in the datum position. The straight edge 91 is held in pure rolling contact with a circular roll generator 94 of radius $R_0$, fixed to the main frame 1 by screws 95, and having its centre on the vertical datum centreline of the figure, the rolling contact being maintained by means of a pair of steel tapes in known manner, while a hydraulic ram (not shown) may be built into the link 89 and serve to pre-load the system.

Movement of the main slide 5 to the right from the datum position into the position shown in the figure will cause the straight edge 91 to roll on the generator 94 thus causing the tangent-link and the grinding wheel to rotate through the involute angle $\phi$ in opposite directions so that a true involute $i$ is generated from the base circle $R_0$. It will be recognized that the complete mechanism is a combination of the tangent-mechanism together with a simple form of control means which rotates the tangent-link sleeve about an instantaneous centre of rotation on the roll generator in the manner required by the invention.

In the complete gear grinding machine shown in Figure 30 a stationary bed 300 carries a horizontal turntable 301 rotatable through 360°, in which a helical gear 302 or workpiece to be generatively ground is mounted. A second horizontal turntable 303 mounted concentrically with the first table on roller-track mountings 304 on the bed 300, and rotatable over a sector of the bed, carries a machine column 305 movable radially on the turntable 303 by means of a guide 306. The column 305 has a vertical feed slide 307 carrying a grinding head 308 indicated in lower and upper run-out positions respectively with a grinding wheel 309 just clear of the gear tooth $302^1$. A dividing mechanism 310 enables successive tooth flanks to be indexed into the correct grinding position relative to the grinding wheel, while all the movements required for cutting, generation of profile and helix, and feed, are imparted to the grinding wheel through the co-operative action of the parts of the machine.

I claim:

1. A gear generating machine head comprising, a generating wheel mounted on a spindle, means including a pivot member mounting said spindle for angular movement about a main pivot axis normal to and co-planar with the generatrix of the operative surface of the generating wheel, a main slide mounting said pivot member to slide along a rectilinear path extending at right angles to the gear radius passing through said main pivot axis when said slide is in its datum position, said rectilinear path being located a distance $R_0+(a)$ from the gear axis, where $R_0$ is the base circle radius of the gear and ($a$) is the distance beyond the base circle to the main pivot axis, and interlocking means controlled by the movement of said slide for correlating said angular and rectilinear movements so that when said main pivot axis is positioned parallel to the gear axis, an angular movement of the spindle about said main pivot axis through an angle $\phi$, as measured from the datum position of the spindle, is accompanied by a rectilinear movement of the main pivot axis of substantially ($a$) tan $\phi - R_0$ sec $\phi$ ($\phi$—sin $\phi$), whereby the said generatrix is substantially a generatrix of an involute generated from the gear base circle.

2. A gear generating machine head according to claim 1 wherein said interlocking means comprises a tangent-mechanism having a tangent-link pivoted at one end to said main slide on an axis parallel with said main pivot axis, a sleeve slidably carried on said tangent-link, means pivotally connecting said sleeve with a second movable slide, guide means constraining said second movable slide for movement along a path having a component of movement at right angles to the direction of movement of said main slide, and means connecting said tangent-link with said pivot member to effect equal angular movements of said spindle and said tangent-link.

3. A gear generating machine according to claim 2 wherein said second slide is constrained to move along a rectilinear guide path arranged at right angles to the path of movement of said main slide.

4. A gear generating machine head as claimed in claim 3; said link sleeve pivot being controlled so that its movement from said datum position corresponding to a rotation $\phi$ of said tangent-link is given by an involute remainder $R_0$ cosec $\phi$ ($\phi$—sin $\phi$) at least to a high order approximation.

5. A gear generating machine head as claimed in claim 4; and including control means for controlling the movement of said second slide along its path comprising a substitute remainder mechanism consisting of an isosceles slider-crank mechanism having a connecting rod pivoted on the control slide and a crank on a pivot fixed relatively to said guides, and a computer operable from said tangent-link sleeve for computably driving said substitute remainder mechanism so as to compensate, at said control slide, for the difference between said true and substitute remainders.

6. A gear generating machine head as claimed in claim 5; said computer comprising a $\phi$-lever rigidly connected to said tangent-link sleeve, and a $\psi$-lever rigidly connected to said connecting rod, said levers being in driving/driven connection one with the other computably.

7. A gear generating machine head as claimed in claim 2 and including; said control means for controlling the movement of said second slide along its path comprising an isosceles slider crank substitute involute remainder mechanism, and a computer operable from said tangent-link sleeve for computably driving said substitute remainder mechanism so as to compensate for the difference between a true remainder and said substitute remainder.

8. A gear generating machine head as claimed in claim 7; said computer comprising a $\phi$-lever rigidly connected to said tangent-link sleeve, and a $\psi$-lever rigidly connected to a connecting rod of said slider-crank mechanism, said levers being in driving/driven connection one with the other computably.

9. A gear generating machine head as claimed in claim 2; said tangent-mechanism further comprising two equal circular segments in pure rolling contact with each other, said segments being mounted respectively on said main pivot and said tangent-link end pivot and being rigidly connected respectively to said spindle holding member and said tangent-link.

10. A gear generating machine head as claimed in claim 2; said tangent-mechanism further comprising two similar slider-crank mechanisms having a common slide in the medial plane between said main pivot and said tangent-link end pivot connected to two equal cranks mounted respectively on said main pivot and said tangent-link end pivot, said two cranks being rigidly connected respectively to said spindle holding member and said tangent-link.

11. A gear generating machine head as claimed in claim 2; said tangent mechanism further comprising a parallelogram linkage wherein said main slide is a base member of said linkage, two equal and parallel levers rigidly connected respectively to said spindle pivot member and said tangent-link, and a tie-rod link connecting the ends of said levers.

12. A gear generating machine head as in claim 1, wherein said interlocking means comprises a tangent-mechanism having a tangent-link, a pivot mounting one end of said link to pivot on said main slide on an axis parallel with said main pivot axis, means mounting said link pivot for transverse shifting movement relative to its axis, a sleeve slidably carried on said tangent-link, means pivotally connecting said sleeve with a second slide, and means connecting said tangent-link with said pivot member to effect equal angular movements of said spindle and said tangent-link.

13. A gear generating machine head as in claim 12, in which said means mounting the link pivot for shifting movement transverse to its axis comprises a rotatable member carrying said link pivot eccentrically thereof.

14. A gear generating machine head as in claim 12, further including adjustable means for shifting said link pivot during motion of said main slide.

15. A gear generating machine head as in claim 1, including further means mounting said spindle pivot member for angular movement about an axis coaxial with the said generatrix whereby the wheel can be adjusted to the desired helix angle when grinding a helical gear.

16. A gear generating machine head comprising: a generating wheel having an operative surface of revolution, rotatably mounted on a spindle; said spindle being carried in a spindle holding member and being angularly movable therewith about a main pivot axially normal to and co-planar with the generatrix of the operative surface of the generating wheel; said main pivot being mounted perpendicularly on a slide slidable on a rectilinear main guide; and means for correlating said angular and rectilinear movements comprising a tangent-mechanism having a tangent-link pivoted at one end to an extension of the main slide and coupled as to rotation $\phi$ equally to the spindle holding member, said tangent-link having a link sleeve slidable relatively along the link and mounted on a link-sleeve virtual pivot, and control means operable from said tangent-link for moving the virtual pivoting point; so that when the said main pivot is positioned parallel to the gear axis and with its rectilinear path a distance $(R_0+a)$ from said gear axis, an angular movement $\phi$ of said spindle holding member measured from a datum position of the mechanism is accompanied by a rectilinear movement $a \cdot \tan \phi - R_0 \sec \phi \, (\phi - \sin \phi)$ of said pivot at least to a high order of approximation, whereby the said generatrix is a generatrix also to a high order of approximation of an involute generated from the gear base circle of radius $R_0$.

17. A gear generating machine head as claimed in claim 16; said virtual pivot and said control means comprising the combination of a straight edge attached at right-angles to said sleeve, a circular roll generator of radius $R_0$ fixed relatively to said main guides, and means for maintaining said straight edge in pure rolling contact with said roll generator.

References Cited in the file of this patent
UNITED STATES PATENTS

| | | |
|---|---|---|
| 903,106 | Phelps | Nov. 3, 1908 |
| 1,668,932 | Aeppli | May 8, 1928 |

UNITED STATES PATENT OFFICE
CERTIFICATE OF CORRECTION

Patent No. 2,888,784 June 2, 1959

Peter Herbert Cleff

It is hereby certified that error appears in the printed specification of the above numbered patent requiring correction and that the said Letters Patent should read as corrected below.

Column 14, line 38, claim 7, before the word "control" strike out "said".

Signed and sealed this 31st day of May 1960.

(SEAL)
Attest:

KARL H. AXLINE
Attesting Officer

ROBERT C. WATSON
Commissioner of Patents